US010970552B2

(12) United States Patent
Leroy et al.

(10) Patent No.: US 10,970,552 B2
(45) Date of Patent: Apr. 6, 2021

(54) SCENE CLASSIFICATION FOR IMAGE PROCESSING

(71) Applicant: GoPro, Inc., San Mateo, CA (US)

(72) Inventors: Sylvain Leroy, Bures-sur-Yvette (FR); Adrien Cariou, Paris (FR); Miguel Marques, Bois d'Arcy (FR); Julien Caron, Crepy-en-Valois (FR); Bruno Faure, Fresnes (FR); Stéphane Belardi, Meudon (FR)

(73) Assignee: GoPro, Inc., San Mateo, CA (US)

( * ) Notice: Subject to any disclaimer, the term of this patent is extended or adjusted under 35 U.S.C. 154(b) by 27 days.

(21) Appl. No.: 16/142,608

(22) Filed: Sep. 26, 2018

(65) Prior Publication Data

US 2019/0095713 A1 Mar. 28, 2019

Related U.S. Application Data

(60) Provisional application No. 62/564,431, filed on Sep. 28, 2017.

(51) Int. Cl.
*G06K 9/00* (2006.01)
*G06K 9/46* (2006.01)
*H04N 9/73* (2006.01)

(52) U.S. Cl.
CPC ....... *G06K 9/00684* (2013.01); *G06K 9/4652* (2013.01); *H04N 9/735* (2013.01)

(58) Field of Classification Search
CPC ... G06K 9/00684; G06K 9/4652; H04N 9/735
USPC ..................................................... 348/222.1
See application file for complete search history.

(56) References Cited

U.S. PATENT DOCUMENTS

| | | | | |
|---|---|---|---|---|
| 8,644,624 | B2* | 2/2014 | Tao | G06K 9/00684 382/224 |
| 8,717,459 | B2* | 5/2014 | Zhang | H04N 9/73 348/223.1 |
| 9,270,959 | B2* | 2/2016 | Shu | H04N 9/04517 |
| 9,578,247 | B2* | 2/2017 | Nishida | H04N 9/735 |
| 9,912,927 | B2* | 3/2018 | Li | H04N 5/232935 |
| 10,043,102 | B1* | 8/2018 | Goenka | G06F 16/583 |
| 10,275,651 | B2* | 4/2019 | Badr | G06F 16/5854 |
| 2004/0208363 | A1* | 10/2004 | Berge | H04N 9/735 382/167 |
| 2008/0062274 | A1* | 3/2008 | Hamamura | H04N 5/23293 348/223.1 |
| 2008/0211925 | A1* | 9/2008 | Misawa | H04N 9/735 348/223.1 |
| 2009/0201390 | A1* | 8/2009 | Mimura | H04N 5/23222 348/222.1 |

(Continued)

*Primary Examiner* — Pritham D Prabhakher
(74) *Attorney, Agent, or Firm* — Young Basile Hanlon & MacFarlane, P.C.

(57) ABSTRACT

Image analysis includes obtaining, from an image signal processor, image processing information corresponding to a previously processed image, obtaining scene classification information for an input image based on the image processing information, generating a processed image by processing the input image based on the scene classification information, and outputting the processed image. The image processing information includes automatic white balance correction information and obtaining the scene classification information includes obtaining the scene classification information based on the automatic white balance correction information.

18 Claims, 11 Drawing Sheets

(56) References Cited

U.S. PATENT DOCUMENTS

| | | | |
|---|---|---|---|
| 2010/0079589 A1* | 4/2010 | Yoshida | H04N 5/23245 |
| | | | 348/81 |
| 2010/0149420 A1* | 6/2010 | Zhang | H04N 9/73 |
| | | | 348/655 |
| 2010/0260419 A1* | 10/2010 | Katoh | G06K 9/00684 |
| | | | 382/167 |
| 2011/0026840 A1* | 2/2011 | Tao | G06K 9/00684 |
| | | | 382/224 |
| 2013/0101223 A1* | 4/2013 | Kawanishi | G06K 9/46 |
| | | | 382/195 |
| 2015/0042844 A1* | 2/2015 | Shu | H04N 9/045 |
| | | | 348/224.1 |
| 2015/0062373 A1* | 3/2015 | Nishida | H04N 9/735 |
| | | | 348/223.1 |
| 2016/0286139 A1* | 9/2016 | Tsuchiya | G06F 3/0362 |
| 2016/0358024 A1* | 12/2016 | Krishnakumar | G06K 9/4671 |
| 2016/0358634 A1* | 12/2016 | Molgaard | H04N 5/23229 |
| 2018/0130222 A1* | 5/2018 | Tafazoli Bilandi | G06T 7/70 |
| 2018/0336414 A1* | 11/2018 | Badr | G06K 9/00671 |
| 2019/0068938 A1* | 2/2019 | Asano | H04N 1/6086 |

* cited by examiner

SCENE CLASSIFICATION FOR IMAGE PROCESSING

CROSS REFERENCE TO RELATED APPLICATIONS

This application claims the benefit of U.S. Provisional Application No. 62/564,431, filed Sep. 28, 2017, the contents of which are incorporated by reference herein in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present disclosure relates to digital image and video processing, including temporal and spatial image noise reduction, local motion compensation, spatially combining images, image distortion compensation, bitrate allocation, image alignment, prevention of highlight clipping, and reduction in lens flare.

BACKGROUND

Image capture devices, such as cameras, may capture content as images or video. Light may be received and focused via a lens and may be converted to an electronic image signal by an image sensor. The image signal may be processed by an image signal processor to form an image, which may be stored and/or encoded. In some implementations, multiple images or video frames may include spatially adjacent or overlapping content. Accordingly, systems, methods, and apparatus for capturing, processing, and/or encoding images, video, or both may be advantageous.

SUMMARY

The present disclosure satisfies the foregoing needs by providing, inter alia, apparatus and methods for image signal processing-based encoding hints for motion estimation.

An aspect of the disclosure relates to a non-transitory computer-readable storage medium, comprising executable instructions that, when executed by a processor, facilitate performance of operations including obtaining, from an image signal processor, image processing information corresponding to a previously processed image, obtaining scene classification information for an input image based on the image processing information, generating a processed image by processing the input image based on the scene classification information, and outputting the processed image.

Another aspect of the disclosure is a method for digital image and video capture, analysis, and processing. The method may include obtaining, from an image signal processor, image processing information corresponding to a previously processed image, obtaining scene classification information for an input image based on the image processing information, generating a processed image by processing the input image based on the scene classification information, and outputting the processed image.

Another aspect of the disclosure is an apparatus. The apparatus includes an image sensor, and a processor configured to obtain, from the image signal processor, image processing information corresponding to a previously processed image, obtain scene classification information for an input image based on the image processing information, generate a processed image by processing the input image based on the scene classification information, and output the processed image.

These and other objects, features, and characteristics of the apparatus, system, and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular forms of "a," "an," and "the" include plural referents unless the context clearly dictates otherwise.

BRIEF DESCRIPTION OF THE DRAWINGS

The disclosed embodiments have other advantages and features which will be more readily apparent from the detailed description, the appended claims, and the accompanying figures. A brief introduction of the figures is below.

All figures disclosed herein are © Copyright 2018 GoPro Inc. All rights reserved.

DETAILED DESCRIPTION

Implementations of the present technology will now be described in detail with reference to the drawings, which are provided as examples so as to enable those skilled in the art to practice the technology. The figures and examples are not meant to limit the scope of the present disclosure to a single implementation or embodiment, and other implementations and embodiments are possible by way of interchange of, or combination with, some or all of the described or illustrated elements. Wherever convenient, the same reference numbers will be used throughout the drawings to refer to same or like parts.

Content, such as visual content, may be captured as one or more images or video frames by one or more image capture devices, such as a camera or camera array. An image capture device may include one or more lenses, image sensors, image signal processors, encoders, or combinations thereof. A lens may receive and focus light on an image sensor or sensors. An image sensor or sensors may sample the light and generate an electronic image signal. An image analysis unit may receive the image signal from one or more image sensors and may analyze the image signal to obtain image analysis information. An image signal processor (ISP) may receive the image signal from one or more image sensors and may process the image signal to generate one or more processed images, pictures, or frames, such as based on the image analysis information.

Image analysis and processing may include color correction to reduce or eliminate some artifacts, such as white balance artifacts or color lens shading artifacts. Image analysis may include obtaining a scene classification for an input image, which may be based on automatic white balance correction information corresponding to a previously processed image. Image analysis may include obtaining automatic white balance correction information. Obtaining automatic white balance correction information may include obtaining weighted average automatic white balance correction information. Obtaining automatic white balance correction information may include obtaining temporally smoothed automatic white balance correction information. Image analysis may include obtaining color lens shading correction information, such as based on the scene classification information.

Image signal processing may include obtaining a color lens shading corrected image based on the input image and the color lens shading correction information. Image signal processing may include obtaining an automatic white balance corrected image based on the input image, or the color lens shading corrected image, and the automatic white balance correction information.

Figure 1:
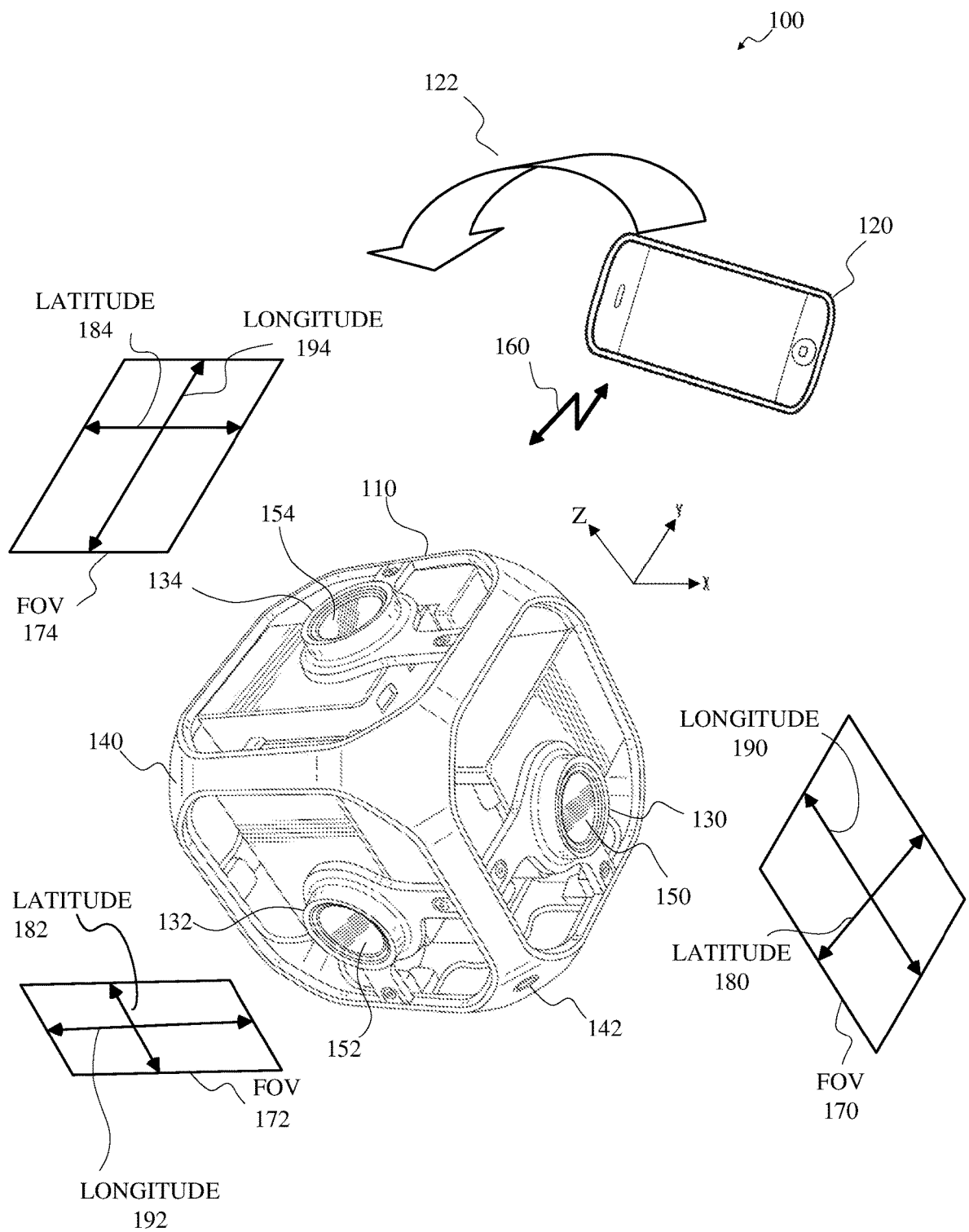
FIG. 1 is a diagram of an example of an image capture system for content capture in accordance with implementations of this disclosure.

FIG. 1 is a diagram of an example of an image capture system 100 for content capture in accordance with implementations of this disclosure. As shown in FIG. 1, an image capture system 100 may include an image capture apparatus 110, an external user interface (UI) device 120, or a combination thereof.

In some implementations, the image capture apparatus 110 may be a multi-face apparatus and may include multiple image capture devices, such as image capture devices 130, 132, 134 as shown in FIG. 1, arranged in a structure 140, such as a cube-shaped cage as shown. Although three image capture devices 130, 132, 134 are shown for simplicity in FIG. 1, the image capture apparatus 110 may include any number of image capture devices. For example, the image capture apparatus 110 shown in FIG. 1 may include six cameras, which may include the three image capture devices 130, 132, 134 shown and three cameras not shown.

In some implementations, the structure 140 may have dimensions, such as between 25 mm and 150 mm. For example, the length of the sides of the structure 140 may be 105 mm. The structure 140 may include a mounting port 142, which may be removably attachable to a supporting structure, such as a tripod, a photo stick, or any other camera mount (not shown). The structure 140 may be a rigid support structure, such that the relative orientation of the image capture devices 130, 132, 134 of the image capture apparatus 110 may be maintained in relatively static or fixed alignment, except as described herein.

The image capture apparatus 110 may obtain, or capture, image content, such as images, video, or both, with a 360° field-of-view, which may be referred to herein as panoramic or spherical content. For example, respective image capture devices 130, 132, 134 may include respective lenses, for receiving and focusing light, and respective image sensors for converting the received and focused light to an image signal, such as by measuring or sampling the light, and the multiple image capture devices 130, 132, 134 may be arranged such that respective image sensors and lenses capture a combined field-of-view characterized by a spherical or near spherical field-of-view.

In some implementations, respective image capture devices 130, 132, 134 may have a respective field-of-view 170, 172, 174, such as a field-of-view 170, 172, 174 that 90° in a lateral, or latitudinal, dimension 180, 182, 184 and includes 120° in a longitudinal dimension 190, 192, 194. In some implementations, image capture devices 130, 132, 134 having overlapping fields-of-view 170, 172, 174, or the image sensors thereof, may be oriented at defined angles, such as at 90°, with respect to one another. In some implementations, the image sensor of the image capture device 130 is directed along the X axis, the image sensor of the image capture device 132 is directed along the Y axis, and the image sensor of the image capture device 134 is directed along the Z axis. The respective fields-of-view 170, 172, 174 for adjacent image capture devices 130, 132, 134 may be oriented to allow overlap for a stitching function. For example, the longitudinal dimension 190 of the field-of-view 170 for the image capture device 130 may be oriented at 900 with respect to the lateral dimension 184 of the field-of-view 174 for the image capture device 134, the lateral dimension 180 of the field-of-view 170 for the image capture device 130 may be oriented at 900 with respect to the longitudinal dimension 192 of the field-of-view 172 for the image capture device 132, and the lateral dimension 182 of the field-of-view 172 for the image capture device 132 may be oriented at 900 with respect to the longitudinal dimension 194 of the field-of-view 174 for the image capture device 134.

The image capture apparatus 110 shown in FIG. 1 may have 420° angular coverage in vertical and/or horizontal planes by the successive overlap of 90°, 120°, 90°, 120° respective fields-of-view 170, 172, 174 (not all shown) for four adjacent image capture devices 130, 132, 134 (not all shown). For example, fields-of-view 170, 172 for the image capture devices 130, 132 and fields-of-view (not shown) for two image capture devices (not shown) opposite the image capture devices 130, 132 respectively may be combined to provide 420° angular coverage in a horizontal plane. In some implementations, the overlap between fields-of-view of image capture devices 130, 132, 134 having a combined field-of-view including less than 360° angular coverage in a vertical and/or horizontal plane may be aligned and merged or combined to produce a panoramic image. For example, the image capture apparatus 110 may be in motion, such as rotating, and source images captured by at least one of the image capture devices 130, 132, 134 may be combined to form a panoramic image. As another example, the image capture apparatus 110 may be stationary, and source images captured contemporaneously by respective image capture device 130, 132, 134 may be combined to form a panoramic image.

In some implementations, an image capture device 130, 132, 134 may include a lens 150, 152, 154 or another optical element. An optical element may include one or more lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical element. In some implementations, a lens 150, 152, 154 may be a fisheye lens and produce fisheye, or near-fisheye, field-of-view images. For example, the respective lenses 150, 152, 154 of the image capture devices 130, 132, 134 may be fisheye lenses. In some implementations, images captured by two or more image capture devices 130, 132, 134 of the image capture apparatus 110 may be combined by stitching or merging fisheye projections of the captured images to produce an equirectangular planar image. For example, a first fisheye image may be a round or elliptical image, and may be transformed to a first rectangular image, a second fisheye image may be a round or elliptical image, and may be transformed to a second rectangular image, and the first and second rectangular images may be arranged side-by-side, which may include overlapping, and stitched together to form the equirectangular planar image.

Although not expressly shown in FIG. 1, In some implementations, an image capture device 130, 132, 134 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIG. 1, In some implementations, an image capture apparatus 110 may include one or more microphones, which may receive, capture, and record audio information, which may be associated with images acquired by the image sensors.

Although not expressly shown in FIG. 1, the image capture apparatus 110 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

In some implementations, the image capture apparatus 110 may interface with or communicate with an external device, such as the external user interface (UI) device 120, via a wired (not shown) or wireless (as shown) computing communication link 160. Although a single computing communication link 160 is shown in FIG. 1 for simplicity, any number of computing communication links may be used. Although the computing communication link 160 shown in FIG. 1 is shown as a direct computing communication link, an indirect computing communication link, such as a link including another device or a network, such as the internet, may be used. In some implementations, the computing communication link 160 may be a Wi-Fi link, an infrared link, a Bluetooth (BT) link, a cellular link, a ZigBee link, a near field communications (NFC) link, such as an ISO/IEC 23243 protocol link, an Advanced Network Technology interoperability (ANT+) link, and/or any other wireless communications link or combination of links. In some implementations, the computing communication link 160 may be a High-Definition Multimedia Interface (HDMI) link, a Universal Serial Bus (USB) link, a digital video interface link, a display port interface link, such as a Video Electronics Standards Association (VESA) digital display interface link, an Ethernet link, a Thunderbolt link, and/or other wired computing communication link.

In some implementations, the user interface device 120 may be a computing device, such as a smartphone, a tablet computer, a phablet, a smart watch, a portable computer, and/or another device or combination of devices configured to receive user input, communicate information with the image capture apparatus 110 via the computing communication link 160, or receive user input and communicate information with the image capture apparatus 110 via the computing communication link 160.

In some implementations, the image capture apparatus 110 may transmit images, such as panoramic images, or portions thereof, to the user interface device 120 via the computing communication link 160, and the user interface device 120 may store, process, display, or a combination thereof the panoramic images.

In some implementations, the user interface device 120 may display, or otherwise present, content, such as images or video, acquired by the image capture apparatus 110. For example, a display of the user interface device 120 may be a viewport into the three-dimensional space represented by the panoramic images or video captured or created by the image capture apparatus 110.

In some implementations, the user interface device 120 may communicate information, such as metadata, to the image capture apparatus 110. For example, the user interface device 120 may send orientation information of the user interface device 120 with respect to a defined coordinate system to the image capture apparatus 110, such that the image capture apparatus 110 may determine an orientation of the user interface device 120 relative to the image capture apparatus 110. Based on the determined orientation, the image capture apparatus 110 may identify a portion of the panoramic images or video captured by the image capture apparatus 110 for the image capture apparatus 110 to send to the user interface device 120 for presentation as the viewport. In some implementations, based on the determined orientation, the image capture apparatus 110 may determine the location of the user interface device 120 and/or the dimensions for viewing of a portion of the panoramic images or video.

In an example, a user may rotate, or sweep, the user interface device 120 through an arc or path 122 in space, as indicated by the arrow shown at 122 in FIG. 1. The user interface device 120 may communicate display orientation information to the image capture apparatus 110 using a communication interface such as the computing communication link 160. The image capture apparatus 110 may provide an encoded bitstream to enable viewing of a portion of the panoramic content corresponding to a portion of the environment of the display location as the image capture apparatus 110 traverses the path 122. Accordingly, display orientation information from the user interface device 120 may be transmitted to the image capture apparatus 110 to control user selectable viewing of captured images and/or video.

In some implementations, the image capture apparatus 110 may communicate with one or more other external devices (not shown) via wired or wireless computing communication links (not shown).

In some implementations, data, such as image data, audio data, and/or other data, obtained by the image capture apparatus 110 may be incorporated into a combined multimedia stream. For example, the multimedia stream may include a video track and/or an audio track. As another example, information from various metadata sensors and/or sources within and/or coupled to the image capture apparatus 110 may be processed to produce a metadata track associated with the video and/or audio track. The metadata track may include metadata, such as white balance metadata, image sensor gain metadata, sensor temperature metadata, exposure time metadata, lens aperture metadata, bracketing configuration metadata and/or other parameters. In some implementations, a multiplexed stream may be generated to incorporate a video and/or audio track and one or more metadata tracks.

In some implementations, the user interface device 120 may implement or execute one or more applications, such as GoPro Studio, the GoPro App, or both, to manage or control the image capture apparatus 110. For example, the user interface device 120 may include an application for controlling camera configuration, video acquisition, video display, or any other configurable or controllable aspect of the image capture apparatus 110.

In some implementations, the user interface device 120, such as via an application, such as the GoPro App, may generate and share, such as via a cloud-based or social media service, one or more images, or short video clips, such as in response to user input.

In some implementations, the user interface device 120, such as via an application, such as the GoPro App, may remotely control the image capture apparatus 110, such as in response to user input.

In some implementations, the user interface device 120, such as via an application, such as the GoPro App, may display unprocessed or minimally processed images or video captured by the image capture apparatus 110 contemporaneously with capturing the images or video by the image capture apparatus 110, such as for shot framing, which may be referred to herein as a live preview, and which may be performed in response to user input.

In some implementations, the user interface device 120, such as via an application, such as the GoPro App, may mark one or more key moments contemporaneously with capturing the images or video by the image capture apparatus 110, such as with a HiLight Tag, such as in response to user input.

In some implementations, the user interface device 120, such as via an application, such as the GoPro App, may display, or otherwise present, marks or tags associated with images or video, such as HiLight Tags, such as in response to user input. For example, marks may be presented in a GoPro Camera Roll application for location review and/or playback of video highlights.

In some implementations, the user interface device 120, such as via an application, such as the GoPro App, may wirelessly control camera software, hardware, or both. For example, the user interface device 120 may include a web-based graphical interface accessible by a user for selecting a live or previously recorded video stream from the image capture apparatus 110 for display on the user interface device 120.

In some implementations, the user interface device 120 may receive information indicating a user setting, such as an image resolution setting, such as 3840 pixels by 2160 pixels, a frame rate setting, such as sixty frames per second (fps), a location setting, and/or a context setting, which may indicate an activity, such as mountain biking, in response to user input, and may communicate the settings, or related information, to the image capture apparatus 110.

Figure 2:
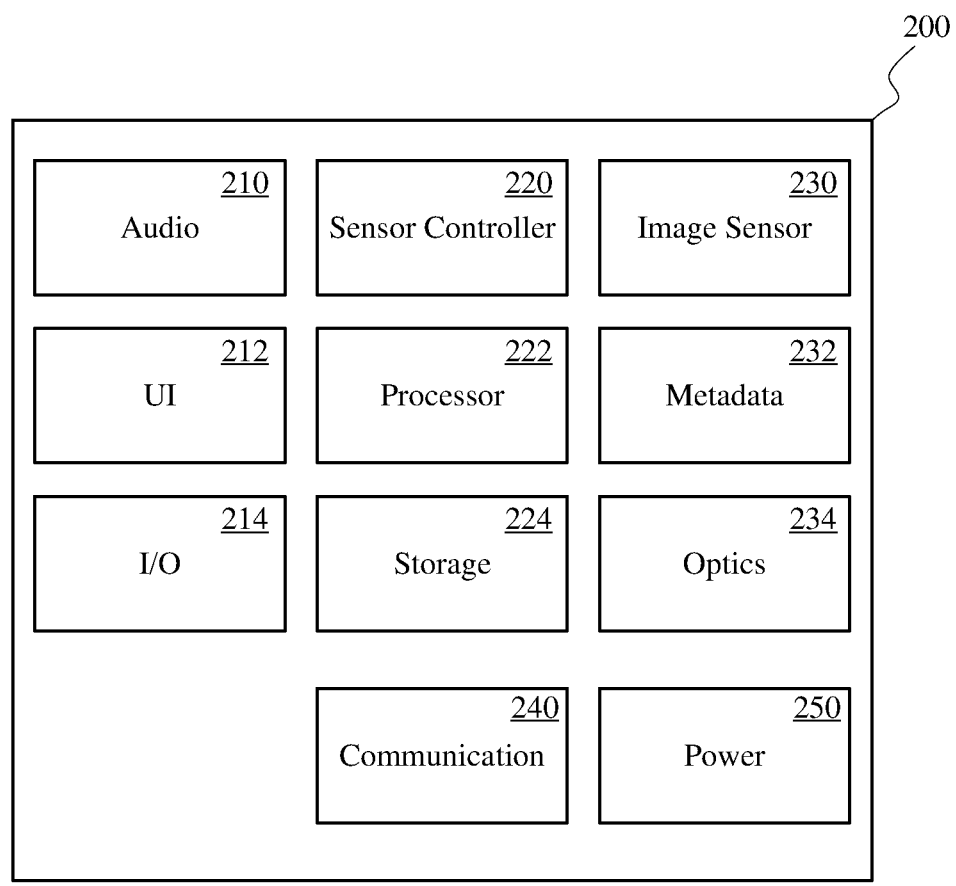
FIG. 2 is a block diagram of an example of an image capture device in accordance with implementations of this disclosure.

FIG. 2 is a block diagram of an example of an image capture device 200 in accordance with implementations of this disclosure. In some implementations, an image capture device 200, such as one of the image capture devices 130, 132, 134 shown in FIG. 1, which may be an action camera, may include an audio component 210, a user interface (UI) unit 212, an input/output (I/O) unit 214, a sensor controller 220, a processor 222, an electronic storage unit 224, an image sensor 230, a metadata unit 232, an optics unit 234, a communication unit 240, a power system 250, or a combination thereof.

In some implementations, the audio component 210, which may include a microphone, may receive, sample, capture, record, or a combination thereof audio information, such as sound waves, which may be associated with, such as stored in association with, image or video content contemporaneously captured by the image capture device 200. In some implementations, audio information may be encoded using, for example, Advanced Audio Coding (AAC), Audio Compression-3 (AC3), Moving Picture Experts Group Layer-3 Audio (MP3), linear Pulse Code Modulation (PCM), Motion Picture Experts Group-High efficiency coding and media delivery in heterogeneous environments (MPEG-H), and/or other audio coding formats or codecs. In one or more implementations of spherical video and/or audio, the audio codec may include a three-dimensional audio codec, such as Ambisonics. For example, an Ambisonics codec can produce full surround audio including a height dimension. Using a G-format Ambisonics codec, a special decoder may be omitted.

In some implementations, the user interface unit 212 may include one or more units that may register or receive input from and/or present outputs to a user, such as a display, a touch interface, a proximity sensitive interface, a light receiving/emitting unit, a sound receiving/emitting unit, a wired/wireless unit, and/or other units. In some implementations, the user interface unit 212 may include a display, one or more tactile elements, such as buttons and/or virtual touch screen buttons, lights (LEDs), speakers, and/or other user interface elements. The user interface unit 212 may receive user input and/or provide information to a user related to the operation of the image capture device 200.

In some implementations, the user interface unit 212 may include a display unit that presents information related to camera control or use, such as operation mode information, which may include image resolution information, frame rate information, capture mode information, sensor mode information, video mode information, photo mode information, or a combination thereof, connection status information, such as connected, wireless, wired, or a combination thereof, power mode information, such as standby mode information, sensor mode information, video mode information, or a combination thereof, information related to other information sources, such as heart rate information, global positioning system information, or a combination thereof, and/or other information.

In some implementations, the user interface unit 212 may include a user interface component such as one or more buttons, which may be operated, such as by a user, to control camera operations, such as to start, stop, pause, and/or resume sensor and/or content capture. The camera control associated with respective user interface operations may be defined. For example, the camera control associated with respective user interface operations may be defined based on the duration of a button press, which may be pulse width modulation, a number of button presses, which may be pulse code modulation, or a combination thereof. In an example, a sensor acquisition mode may be initiated in response to detecting two short button presses. In another example, the initiation of a video mode and cessation of a photo mode, or the initiation of a photo mode and cessation of a video mode, may be triggered or toggled in response to a single short button press. In another example, video or photo capture for a given time duration or a number of frames, such as burst capture, may be triggered in response to a single short button press. Other user command or communication implementations may also be implemented, such as one or more short or long button presses.

In some implementations, the I/O unit 214 may synchronize the image capture device 200 with other cameras and/or with other external devices, such as a remote control, a second image capture device, a smartphone, a user interface device, such as the user interface device 120 shown in FIG. 1, and/or a video server. The I/O unit 214 may communicate information between I/O components. In some implementations, the I/O unit 214 may be connected to the communication unit 240 to provide a wired and/or wireless communications interface, such as a Wi-Fi interface, a Bluetooth interface, a USB interface, an HDMI interface, a Wireless USB interface, a Near Field Communication (NFC) interface, an Ethernet interface, a radio frequency transceiver interface, and/or other interfaces, for communication with one or more external devices, such as a user interface device, such as the user interface device 120 shown in FIG. 1, or another metadata source. In some implementations, the I/O unit 214 may interface with LED lights, a display, a button, a microphone, speakers, and/or other I/O components. In some implementations, the I/O unit 214 may interface with an energy source, such as a battery, and/or a Direct Current (DC) electrical source.

In some implementations, the I/O unit 214 of the image capture device 200 may include one or more connections to external computerized devices for configuration and/or management of remote devices, as described herein. The I/O unit 214 may include any of the wireless or wireline interfaces described herein, and/or may include customized or proprietary connections for specific applications.

In some implementations, the sensor controller 220 may operate or control the image sensor 230, such as in response to input, such as user input. In some implementations, the sensor controller 220 may receive image and/or video input from the image sensor 230 and may receive audio information from the audio component 210.

In some implementations, the processor 222 may include a system on a chip (SOC), microcontroller, microprocessor, central processing unit (CPU), digital signal processor (DSP), application-specific integrated circuit (ASIC), graphics processing unit (GPU), and/or other processor that may control the operation and functionality of the image capture device 200. In some implementations, the processor 222 may interface with the sensor controller 220 to obtain and process sensory information, such as for object detection, face tracking, stereo vision, and/or other image processing.

In some implementations, the sensor controller 220, the processor 222, or both may synchronize information received by the image capture device 200. For example, timing information may be associated with received sensor data, and metadata information may be related to content, such as images or videos, captured by the image sensor 230 based on the timing information. In some implementations, the metadata capture may be decoupled from video/image capture. For example, metadata may be stored before, after, and in-between the capture, processing, or storage of one or more video clips and/or images.

In some implementations, the sensor controller 220, the processor 222, or both may evaluate or process received metadata and may generate other metadata information. For example, the sensor controller 220 may integrate the received acceleration information to determine a velocity profile for the image capture device 200 concurrent with recording a video. In some implementations, video information may include multiple frames of pixels and may be encoded using an encoding method, such as H.264, H.265, CineForm and/or other codecs.

Although not shown separately in FIG. 2, one or more of the audio component 210, the user interface unit 212, the I/O unit 214, the sensor controller 220, the processor 222, the electronic storage unit 224, the image sensor 230, the metadata unit 232, the optics unit 234, the communication unit 240, or the power systems 250 of the image capture device 200 may communicate information, power, or both with one or more other units, such as via an electronic communication pathway, such as a system bus. For example, the processor 222 may interface with the audio component 210, the user interface unit 212, the I/O unit 214, the sensor controller 220, the electronic storage unit 224, the image sensor 230, the metadata unit 232, the optics unit 234, the communication unit 240, or the power systems 250 via one or more driver interfaces and/or software abstraction layers. In some implementations, one or more of the units shown in FIG. 2 may include a dedicated processing unit, memory unit, or both (not shown). In some implementations, one or more components may be operable by one or more other control processes. For example, a global positioning system receiver may include a processing apparatus that may provide position and/or motion information to the processor 222 in accordance with a defined schedule, such as values of latitude, longitude, and elevation at 10 Hz.

In some implementations, the electronic storage unit 224 may include a system memory module that may store executable computer instructions that, when executed by the processor 222, perform various functionalities including those described herein. For example, the electronic storage unit 224 may be a non-transitory computer-readable storage medium, which may include executable instructions, and a processor, such as the processor 222 may execute the instruction to perform one or more, or portions of one or more, of the operations described herein. The electronic storage unit 224 may include storage memory for storing content, such as metadata, images, audio, or a combination thereof, captured by the image capture device 200.

In some implementations, the electronic storage unit 224 may include non-transitory memory for storing configuration information and/or processing code for video information and metadata capture, and/or to produce a multimedia stream that may include video information and metadata in accordance with the present disclosure. In some implementations, the configuration information may include capture type, such as video or still image, image resolution, frame rate, burst setting, white balance, recording configuration, such as loop mode, audio track configuration, and/or other parameters that may be associated with audio, video, and/or metadata capture. In some implementations, the electronic storage unit 224 may include memory that may be used by other hardware/firmware/software elements of the image capture device 200.

In some implementations, the image sensor 230 may include one or more of a charge-coupled device sensor, an active pixel sensor, a complementary metal-oxide semiconductor sensor, an N-type metal-oxide-semiconductor sensor, and/or another image sensor or combination of image sensors. In some implementations, the image sensor 230 may be controlled based on control signals from a sensor controller 220.

The image sensor 230 may sense or sample light waves gathered by the optics unit 234 and may produce image data or signals. The image sensor 230 may generate an output signal conveying visual information regarding the objects or other content corresponding to the light waves received by the optics unit 234. The visual information may include one or more of an image, a video, and/or other visual information.

In some implementations, the image sensor 230 may include a video sensor, an acoustic sensor, a capacitive sensor, a radio sensor, a vibrational sensor, an ultrasonic sensor, an infrared sensor, a radar sensor, a Light Detection And Ranging (LIDAR) sensor, a sonar sensor, or any other sensory unit or combination of sensory units capable of detecting or determining information in a computing environment.

In some implementations, the metadata unit 232 may include sensors such as an inertial measurement unit, which may include one or more accelerometers, one or more gyroscopes, a magnetometer, a compass, a global positioning system sensor, an altimeter, an ambient light sensor, a temperature sensor, and/or other sensors or combinations of sensors. In some implementations, the image capture device 200 may contain one or more other sources of metadata information, telemetry, or both, such as image sensor parameters, battery monitor, storage parameters, and/or other information related to camera operation and/or capture of content. The metadata unit 232 may obtain information related to the environment of the image capture device 200 and aspects in which the content is captured.

For example, the metadata unit 232 may include an accelerometer that may provide device motion information including velocity and/or acceleration vectors representative of motion of the image capture device 200. In another example, the metadata unit 232 may include a gyroscope that may provide orientation information describing the orientation of the image capture device 200. In another example, the metadata unit 232 may include a global positioning system sensor that may provide global positioning system coordinates, time, and information identifying a location of the image capture device 200. In another example, the metadata unit 232 may include an altimeter that may obtain information indicating an altitude of the image capture device 200.

In some implementations, the metadata unit 232, or one or more portions thereof, may be rigidly coupled to the image capture device 200 such that motion, changes in orientation, or changes in the location of the image capture device 200 may be accurately detected by the metadata unit 232. Although shown as a single unit, the metadata unit 232, or one or more portions thereof, may be implemented as multiple distinct units. For example, the metadata unit 232 may include a temperature sensor as a first physical unit and a global positioning system unit as a second physical unit. In some implementations, the metadata unit 232, or one or more portions thereof, may be included in an image capture device 200 as shown or may be included in a physically separate unit operatively coupled to, such as in communication with, the image capture device 200.

In some implementations, the optics unit 234 may include one or more of a lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optics component. In some implementations, the optics unit 234 may include a focus controller unit that may control the operation and configuration of the camera lens. The optics unit 234 may receive light from an object and may focus received light onto an image sensor 230. Although not shown separately in FIG. 2, in some implementations, the optics unit 234 and the image sensor 230 may be combined, such as in a combined physical unit, such as a housing.

In some implementations, the communication unit 240 may be coupled to the I/O unit 214 and may include a component, such as a dongle, having an infrared sensor, a radio frequency transceiver and antenna, an ultrasonic transducer, and/or other communications interfaces used to send and receive wireless communication signals. In some implementations, the communication unit 240 may include a local, such as Bluetooth or Wi-Fi, and/or broad range, such as cellular LTE, communications interface for communication between the image capture device 200 and a remote device, such as the user interface device 120 in FIG. 1. The communication unit 240 may communicate using, for example, Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. In some implementations, the communication unit 240 may communicate using networking protocols, such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged via the communication unit 240 may be represented using formats including one or more of hypertext markup language (HTML), extensible markup language (XML), and/or other formats. One or more exchanges of information between the image capture device 200 and remote or external devices may be encrypted using encryption technologies including one or more of secure sockets layer (SSL), transport layer security (TLS), virtual private networks (VPNs), Internet Protocol security (IPsec), and/or other encryption technologies.

In some implementations, the one or more power systems 250 supply power to the image capture device 200. For example, for a small-sized, lower-power action camera a wireless power solution, such as battery, solar cell, inductive, such as contactless, power source, rectification, and/or other power supply, may be used.

Consistent with the present disclosure, the components of the image capture device 200 may be remote from one another and/or aggregated. For example, one or more sensor components may be distal from the image capture device 200, such as shown and described with respect to FIG. 1. Multiple mechanical, sensory, or electrical units may be controlled by a learning apparatus via network/radio connectivity.

Figure 3:
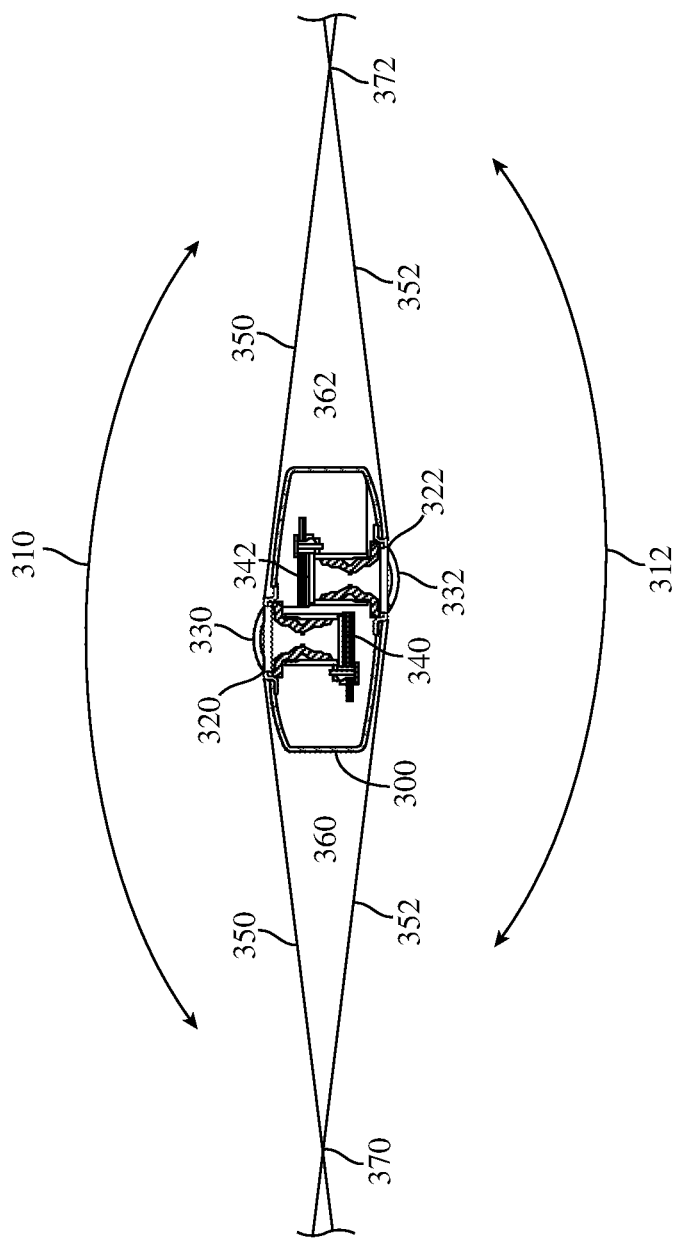
FIG. 3 is a cross-sectional view of an example of an image capture apparatus including overlapping fields-of-view in accordance with implementations of this disclosure.

FIG. 3 is a cross-sectional view of an example of a dual-lens image capture apparatus 300 including overlapping fields-of-view 310, 312 in accordance with implementations of this disclosure. In some implementations, the image capture apparatus 300 may be a spherical image capture apparatus with fields-of-view 310, 312 as shown in FIG. 3. For example, the image capture apparatus 300 may include image capture devices 320, 322, related components, or a combination thereof, arranged in a back-to-back or Janus configuration. For example, a first image capture device 320 may include a first lens 330 and a first image sensor 340, and a second image capture device 322 may include a second lens 332 and a second image sensor 342 arranged oppositely from the first lens 330 and the first image sensor 340.

The first lens 330 of the image capture apparatus 300 may have the field-of-view 310 shown above a boundary 350. Behind the first lens 330, the first image sensor 340 may capture a first hyper-hemispherical image plane from light entering the first lens 330, corresponding to the first field-of-view 310.

The second lens 332 of the image capture apparatus 300 may have a field-of-view 312 as shown below a boundary 352. Behind the second lens 332, the second image sensor 342 may capture a second hyper-hemispherical image plane from light entering the second lens 332, corresponding to the second field-of-view 312.

In some implementations, one or more areas, such as blind spots 360, 362, may be outside of the fields-of-view 310, 312 of the lenses 330, 332, light may be obscured from the lenses 330, 332 and the corresponding image sensors 340, 342, and content in the blind spots 360, 362 may be omitted from capture. In some implementations, the image capture apparatus 300 may be configured to minimize the blind spots 360, 362.

In some implementations, the fields-of-view 310, 312 may overlap. Stitch points 370, 372, proximal to the image capture apparatus 300, at which the fields-of-view 310, 312 overlap may be referred to herein as overlap points or stitch points. Content captured by the respective lenses 330, 332, distal to the stitch points 370, 372, may overlap.

In some implementations, images contemporaneously captured by the respective image sensors 340, 342 may be combined to form a combined image. Combining the respective images may include correlating the overlapping regions captured by the respective image sensors 340, 342, aligning the captured fields-of-view 310, 312, and stitching the images together to form a cohesive combined image.

In some implementations, a small change in the alignment, such as position and/or tilt, of the lenses 330, 332, the image sensors 340, 342, or both may change the relative positions of their respective fields-of-view 310, 312 and the locations of the stitch points 370, 372. A change in alignment may affect the size of the blind spots 360, 362, which may include changing the size of the blind spots 360, 362 unequally.

In some implementations, incomplete or inaccurate information indicating the alignment of the image capture devices 320, 322, such as the locations of the stitch points 370, 372, may decrease the accuracy, efficiency, or both of generating a combined image. In some implementations, the image capture apparatus 300 may maintain information indicating the location and orientation of the lenses 330, 332 and the image sensors 340, 342 such that the fields-of-view 310, 312, stitch points 370, 372, or both may be accurately determined, which may improve the accuracy, efficiency, or both of generating a combined image.

In some implementations, optical axes through the lenses 330, 332 may be substantially antiparallel to each other, such that the respective axes may be within a tolerance such as 1%, 3%, 5%, 10%, and/or other tolerances. In some implementations, the image sensors 340, 342 may be substantially perpendicular to the optical axes through their respective lenses 330, 332, such that the image sensors may be perpendicular to the respective axes to within a tolerance such as 1%, 3%, 5%, 10%, and/or other tolerances.

In some implementations, the lenses 330, 332 may be laterally offset from each other, may be off-center from a central axis of the image capture apparatus 300, or may be laterally offset and off-center from the central axis. As compared to an image capture apparatus with back-to-back lenses, such as lenses aligned along the same axis, the image capture apparatus 300 including laterally offset lenses 330, 332 may include substantially reduced thickness relative to the lengths of the lens barrels securing the lenses 330, 332. For example, the overall thickness of the image capture apparatus 300 may be close to the length of a single lens barrel as opposed to twice the length of a single lens barrel as in a back-to-back configuration. Reducing the lateral distance between the lenses 330, 332 may improve the overlap in the fields-of-view 310, 312.

In some implementations, images or frames captured by an image capture apparatus, such as the image capture apparatus 110 shown in FIG. 1 or the image capture apparatus 300 shown in FIG. 3, may be combined, merged, or stitched together, to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

Figure 4:
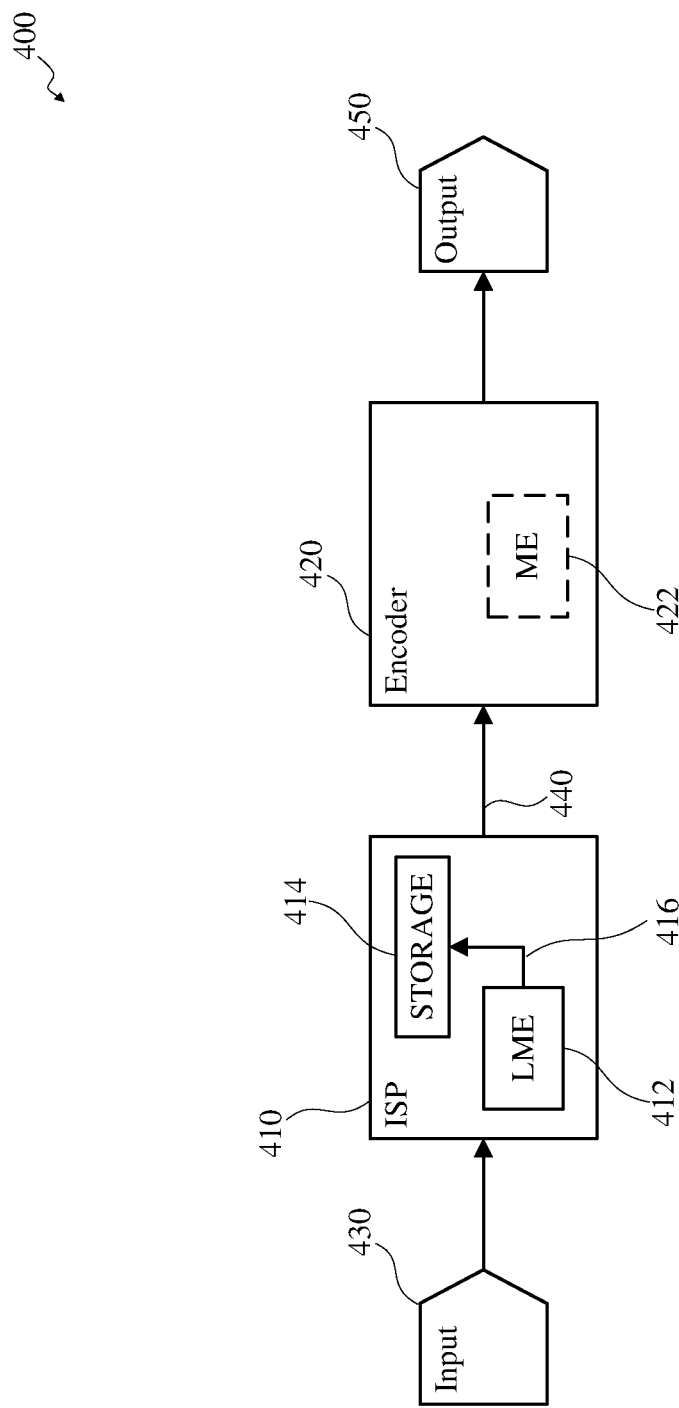
FIG. 4 is a block diagram of an example of an image processing and coding pipeline in accordance with implementations of this disclosure.

FIG. 4 is a block diagram of an example of an image processing and coding pipeline 400 in accordance with implementations of this disclosure. In some implementations, the image processing and coding pipeline 400 may be included in an image capture device, such as the image capture device 200 shown in FIG. 2, or an image capture apparatus, such as the image capture apparatus 110 shown in FIG. 1 or the image capture apparatus 300 shown in FIG. 3. In some implementations, the image processing and coding pipeline 400 may include an image signal processor (ISP) 410, an encoder 420, or a combination thereof.

In some implementations, the image signal processor 410 may receive an input image signal 430. For example, an image sensor (not shown), such as image sensor 230 shown in FIG. 2, may capture an image, or a portion thereof, and may send, or transmit, the captured image, or image portion, to the image signal processor 410 as the input image signal 430. In some implementations, an image, or frame, such as an image, or frame, included in the input image signal, may be one of a sequence or series of images or frames of a video, such as a sequence, or series, of frames captured at a rate, or frame rate, which may be a number or cardinality of frames captured per defined temporal period, such as twenty-four, thirty, or sixty frames per second.

In some implementations, the image signal processor 410 may include a local motion estimation (LME) unit 412, which may generate local motion estimation information for use in image signal processing and encoding, such as in correcting distortion, stitching, and/or motion compensation. In some implementations, the local motion estimation unit 412 may partition the input image signal 430 into blocks, such as having 4×4, 16×16, 64×64, and/or other dimensions. In some implementations, the local motion estimation unit 412 may partition the input image signal 430 into arbitrarily shaped patches and/or individual pixels.

In some implementations, the local motion estimation unit 412 may compare pixel values of blocks of pixels between image frames, such as successive image frames, from the input image signal 430 to determine displacement, or movement, between frames. The local motion estimation unit 412 may produce motion vectors, such as an 'x' component and a 'y' component of motion, at multiple locations within an image frame. The motion vectors may be represented by a translational model or other models that may approximate camera motion, such as rotation and translation in three dimensions, and zooming.

In some implementations, the image signal processor 410 of the image processing and coding pipeline 400 may include an internal electronic storage unit 414, such as shared memory, such as random-access memory (RAM), flash, or other types of memory. The internal electronic storage unit 414 may store local motion estimation information 416 determined by the local motion estimation unit 412 for one or more frames. The local motion estimation information 416 and associated image or images may be output 440 to the encoder 420. In some implementations, the internal electronic storage unit 414 may include a buffer, or cache, and may buffer the input image signal as an input, or source, image, or frame.

In some implementations, the image signal processor 410 may output an image, associated local motion estimation information 416, or both as the output 440. For example, the image signal processor 410 may receive the input image signal 430, process the input image signal 430, and output a processed image as the output 440. Processing the input image signal 430 may include generating and using the local motion estimation information 416, spatiotemporal noise reduction (3DNR), dynamic range enhancement, local tone adjustment, exposure adjustment, contrast adjustment, image stitching, and/or other operations.

The encoder 420 may encode or compress the output 440 of the image signal processor 410. In some implementations, the encoder 420 may implement the one or more encoding standards, which may include motion estimation.

In some implementations, the encoder 420 may output encoded video as an encoded output 450. For example, the encoder 420 may receive the output 440 of the image signal processor 410, which may include processed images, the local motion estimation information 416, or both. The encoder 420 may encode the images and may output the encoded images as the encoded output 450.

In some implementations, the encoder 420 may include a motion estimation unit 422 that may determine motion information for encoding the image output 440 of the image signal processor 410. In some implementations, the encoder 420 may encode the image output 440 of the image signal processor 410 using motion information generated by the motion estimation unit 422 of the encoder 420, the local motion estimation information 416 generated by the local motion estimation unit 412 of the image signal processor 410, or a combination thereof.

For example, the motion estimation unit 422 may determine motion information at pixel block sizes that may differ from pixel block sizes used by the local motion estimation unit 412. In another example, the motion estimation unit 422 of the encoder 420 may generate motion information and the encoder may encode the image output 440 of the image signal processor 410 using the motion information generated by the motion estimation unit 422 of the encoder 420 and the local motion estimation information 416 generated by the local motion estimation unit 412 of the image signal processor 410. In another example, the motion estimation unit 422 of the encoder 420 may use the local motion estimation information 416 generated by the local motion estimation unit 412 of the image signal processor 410 as input for efficiently and accurately generating motion information.

In some implementations, the image signal processor 410, the encoder 420, or both may be distinct units, as shown. For example, the image signal processor 410 may include a motion estimation unit, such as the local motion estimation unit 412 as shown, and/or the encoder 420 may include a motion estimation unit, such as the motion estimation unit 422.

In some implementations, the image signal processor 410 may store motion information, such as the local motion estimation information 416, in a memory, such as the internal electronic storage unit 414, and the encoder 420 may read the motion information from the internal electronic storage unit 414 or otherwise receive the motion information from the image signal processor 410. The encoder 420 may use the motion estimation information determined by the image signal processor 410 for motion compensation processing.

Figure 5:
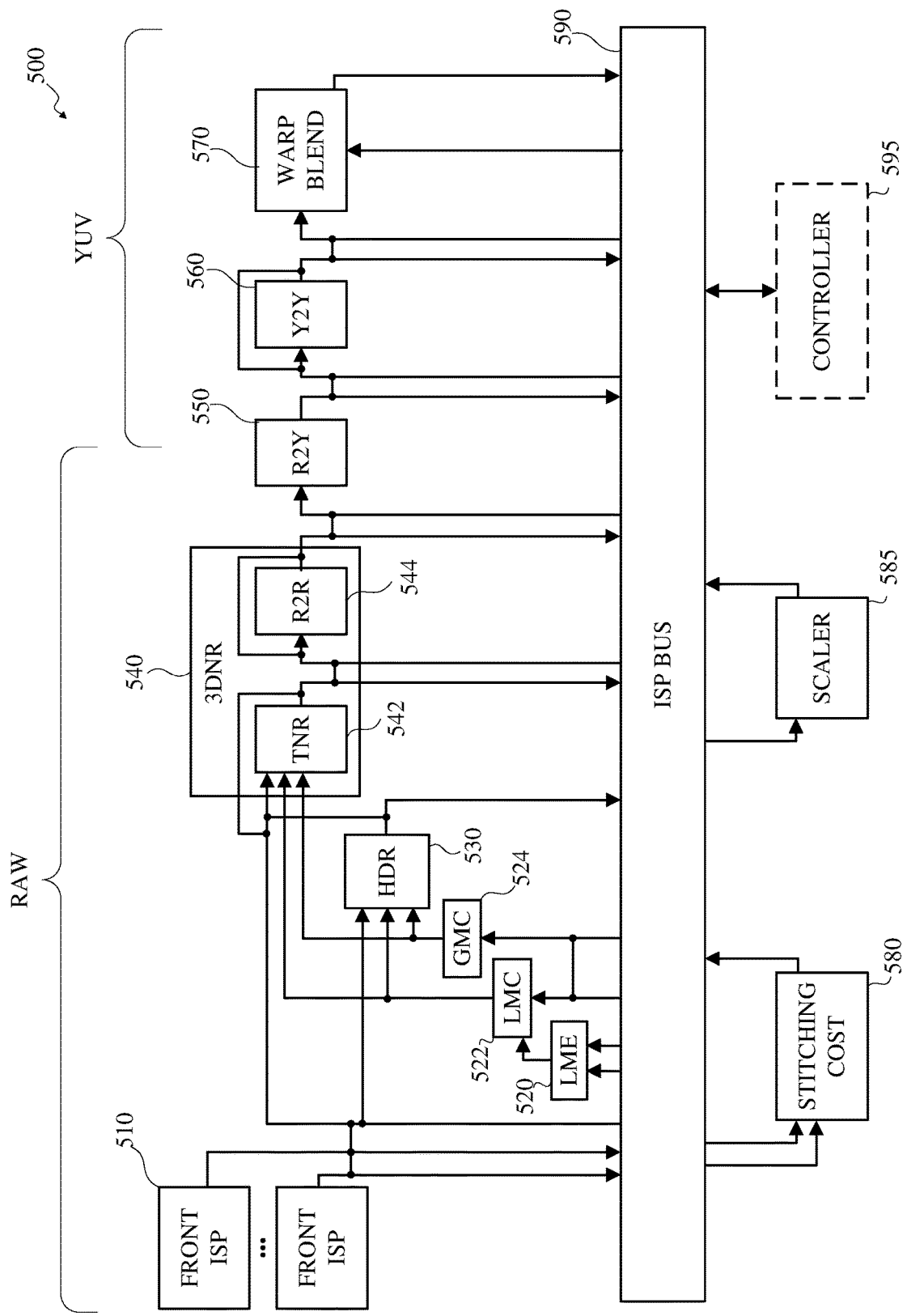
FIG. 5 is a functional block diagram of an example of an image signal processor in accordance with implementations of this disclosure.

FIG. 5 is a functional block diagram of an example of an image signal processor 500 in accordance with implementations of this disclosure. An image signal processor 500 may be included in an image capture device, such as the image capture device 200 shown in FIG. 2, or an image capture apparatus, such as the image capture apparatus 110 shown in FIG. 1 or the image capture apparatus 300 shown in FIG. 3. In some implementations, the image signal processor 500 may be similar to the image signal processor 410 shown in FIG. 4.

The image signal processor 500 may receive an image signal, such as from an image sensor (not shown), such as the image sensor 230 shown in FIG. 2, in a defined format, such as a format of the image sensor, which may be referred to herein as "raw," such as "a raw image," "raw image data," "raw data," "a raw signal," or "a raw image signal." For example, the raw image signal may be in a format such as RGB format, which may represent individual pixels using a combination of values or components, such as a red component (R), a green component (G), and a blue component (B). In another example, the raw image signal may be in a Bayer format, wherein a respective pixel may be one of a combination of adjacent pixels, such as a combination of four adjacent pixels, of a Bayer pattern. For clarity, a sequence of pixels forming a Bayer pattern may be referred to herein as a Bayer. In some implementations, the image signal processor 500 may convert the raw image data (RGB data) to another format, such as a format expressing individual pixels using a combination of values or components, such as a luminance, or luma, value (Y), a blue chrominance, or chroma, value (U or Cb), and a red chroma value (V or Cr), such as the YUV or YCbCr formats.

The image signal processor 500 may include a front image signal processor (Front ISP) 510, or multiple front image signal processors as shown, a local motion estimation (LME) unit 520, a local motion compensation (LMC) unit 522, a global motion compensation (GMC) unit 524, a high dynamic range (HDR) unit 530, a three-dimensional noise reduction (3DNR) unit 540, which may include a temporal noise reduction (TNR) unit 542 and a raw to raw (R2R) unit 544, a raw to YUV (R2Y) unit 550, a YUV to YUV (Y2Y) unit 560, a warp and blend unit 570, a stitching cost unit 580, a scaler 585, an image signal processing bus (ISP BUS) 590, a configuration controller 595, or a combination thereof.

Although not shown expressly in FIG. 5, in some implementations, one or more of the front image signal processor 510, the local motion estimation unit 520, the local motion compensation unit 522, the global motion compensation unit 524, the high dynamic range unit 530, the three-dimensional noise reduction unit 540, the temporal noise reduction unit 542, the raw to raw unit 544, the raw to YUV unit 550, the YUV to YUV unit 560, the warp and blend unit 570, the stitching cost unit 580, the scaler 585, the image signal processing bus 590, the configuration controller 595, or any combination thereof, may include a respective clock, power domain, or both.

In some implementations, the front image signal processor 510 may minimally process image signals received from respective image sensors, which may include image scaling. Scaling, by the front image signal processor 510, may include processing pixels, such as a defined cardinality of pixels, corresponding to a determined quality. For example, the front image signal processor 510 may correct dead pixels, perform band processing, decouple vertical blanking, or a combination thereof. In some implementations, the front image signal processor 510 may output a high-resolution frame, one or more downscaled, or reduced, resolution frames, such as a ½×½ resolution frame, a ¼×¼ resolution frame, a ⅛×⅛ resolution frame, a 1/16×1/16 resolution frame, a 1/32×1/32 resolution frame, or any combination thereof.

In some implementations, a multiple camera apparatus, such as the image capture apparatus 110 shown in FIG. 1, may include multiple image capture devices, such as the image capture device 200 shown in FIG. 2, and may include a respective front image signal processor 510 associated with a respective image capture device.

The local motion estimation unit 520 may receive, or otherwise access, an input frame, or one or more portions thereof, which may be a current input frame, such as via the image signal processor bus 590. In some implementations, the local motion estimation unit 520 may receive the current input frame at a downscaled, or reduced, resolution. In some implementations, such as implementations implementing high dynamic range image processing, the current input frame may be a long exposure input frame.

The local motion estimation unit 520 may receive, or otherwise access, a reference frame, or one or more portions thereof, such as via the image signal processor bus 590. The reference frame may be a previously generated motion compensated prior frame, which may be associated with a temporal location preceding a temporal location associated with the current input frame. For example, the reference frame may be a recirculated frame from the temporal noise reduction unit 542. In some implementations, such as implementations including high dynamic range image processing, the reference frame may be a short exposure input frame corresponding to the long exposure current input frame.

In some implementations, the local motion estimation unit 520 may receive, or otherwise access, previously generated motion information, such as previously generated motion vectors for the current input frame or motion information for a previously processed frame.

The local motion estimation unit 520 may determine motion information, such as motion vectors, representing motion between the current input frame and the reference frame, such as motion caused by moving objects in the field-of-view or non-rotational motion, or translation, of the field-of-view. The local motion estimation unit 520 may output the motion information. For example, the local motion estimation unit 520 may output motion vectors to the local motion compensation unit 522.

The local motion compensation unit 522 may receive, or otherwise access, the reference frame, or one or more portions thereof, such as via the image signal processor bus 590. For example, in some implementations, such as implementations implementing high dynamic range image processing, the reference frame may be the short exposure input frame. In another example, in some implementations implementing high dynamic range image processing, the reference frame may be the long exposure input frame.

The local motion compensation unit 522 may receive, or otherwise access, motion information, such as motion vectors, associated with the current input frame. For example, the local motion compensation unit 522 may receive the motion vectors from the local motion estimation unit 520.

The local motion compensation unit 522 may apply the motion vectors to the reference frame, or one or more portions thereof, which may align, or partially align, the reference frame, or one or more portions thereof, with the current input frame, or one or more portions thereof.

The local motion compensation unit 522 may output a local motion compensated reference frame, or one or more portions thereof.

The global motion compensation unit 524 may receive, or otherwise access, the reference frame, or one or more portions thereof, such as via the image signal processor bus 590. For example, in some implementations, such as implementations implementing high dynamic range image processing, the reference frame may be the short exposure input frame. In another example, in some implementations implementing high dynamic range image processing, the reference frame may be the long exposure input frame.

The global motion compensation unit 524 may receive, or otherwise access, global motion information, such as global motion information from a gyroscopic unit of the image capture apparatus, such as a gyroscopic sensor included in the metadata unit 232 shown in FIG. 2, corresponding to the current input frame. The global motion information may indicate a rotational change in the orientation of the field-of-view relative to the content captured in respective images. For example, the global motion information may indicate a horizontal change of the field-of-view, which may indicate that the corresponding camera panned, or rotated, around a vertical axis. In another example, the global motion information may indicate a vertical change of the field-of-view, which may indicate that the camera tilted or rotated around an axis perpendicular to the lens. In another example, the global motion information may indicate a rotational change of the field-of-view relative to the horizon, which may indicate that the camera rolled or rotated around an axis parallel to the lens. The global motion information may be distinct from motion information, such as translation motion information, indicating a change in the geospatial location of the image capture apparatus, which may include a change associated with changing an elevation of the image capture apparatus. In some embodiments, other changes affecting the frame, such as zooming, may be included as global motion.

The global motion compensation unit 524 may apply the global motion information to the reference frame, or one or more portions thereof, which may align, or partially align, the reference frame, or one or more portions thereof, with the current input frame, or one or more portions thereof.

The global motion compensation unit 524 may output a global motion compensated reference frame, or one or more portions thereof.

The high dynamic range unit 530 may receive, or otherwise access, the current input frame, or one or more portions thereof, such as from the front image signal processor 510. The current input frame may be a long exposure input frame corresponding to the short exposure reference frame. The high dynamic range unit 530 may receive, or otherwise access, the local motion compensated reference frame from the local motion compensation unit 522. The high dynamic range unit 530 may receive, or otherwise access, the global motion compensated reference frame from the global motion compensation unit 524.

The high dynamic range unit 530 may generate a high dynamic range image based on the current input image and the local motion compensated reference frame, the global motion compensated reference frame, or a combination thereof. For example, for a respective portion of the reference frame, such as a respective block, a respective pixel, or a respective Bayer, the temporal noise reduction unit 530 may identify a value for the portion based on the corresponding portion of the local motion compensated reference frame or the corresponding portion of the global motion compensated reference frame.

The high dynamic range unit 530 may output the high dynamic range image. For example, the high dynamic range unit 530 may output the high dynamic range image by storing the high dynamic range image in memory, such as shared memory, via the image signal processor bus 590, or the high dynamic range unit 530 may output the high dynamic range image directly to another unit of the image signal processor 500, such as the temporal noise reduction unit 542.

In some implementations, the high dynamic range unit 530 may be omitted, or high dynamic range processing by the high dynamic range unit 530 may be omitted.

The three-dimensional noise reduction unit 540 may include the temporal noise reduction (TNR) unit 542, the raw to raw (R2R) unit 544, or both.

The temporal noise reduction unit 542 may receive the current input frame, or one or more portions thereof, such as from the front image signal processor 510 or via the image signal processor bus 590. In some implementations, such as implementations implementing high dynamic range image processing, the temporal noise reduction unit 542 may receive the high dynamic range input frame, or one or more portions thereof, such as from the high dynamic range unit 530, as the current input frame.

The temporal noise reduction unit 542 may receive, or otherwise access, the local motion compensated reference frame from the local motion compensation unit 522. The temporal noise reduction unit 542 may receive, or otherwise access, the global motion compensated reference frame from the global motion compensation unit 524.

The temporal noise reduction unit 542 may reduce temporal noise in the current input frame, which may include recursively reducing temporal noise in a sequence of input images, such as a video. Recursive temporal noise reduction may include combining a current image with noise feedback information corresponding to a previously processed frame, such as the reference frame, which may be a recirculated frame. For example, the reference frame may be the local motion compensated frame output by the local motion compensation unit 522, the global motion compensated frame output by the global motion compensation unit 524, or a combination thereof. For example, for a respective portion of the reference frame, such as a respective block, a respective pixel, or a respective Bayer, the temporal noise reduction unit 530 may identify a value for the portion based on the corresponding portion of the local motion compensated reference frame or the corresponding portion of the global motion compensated reference frame.

The temporal noise reduction unit 542 may generate output including a pixel value and associated noise variance for the pixel value for one or more pixels of the current input frame.

The raw to raw unit 544 may perform spatial denoising of frames of raw images based on noise variance values received from the temporal noise reduction unit 542. For example, spatial denoising in the raw to raw unit 544 may include multiple passes of image signal processing, including passes at various resolutions.

The raw to YUV unit 550 may demosaic, and/or color process, the frames of raw images, which may include representing respective pixels in the YUV format, which may include a combination of a luminance (Y) component and two chrominance (UV) components.

The YUV to YUV unit 560 may perform local tone mapping of YUV images. In some implementations, the YUV to YUV unit 560 may include multi-scale local tone mapping using a single pass approach or a multi-pass approach on a frame at different scales.

The warp and blend unit 570 may warp images, blend images, or both. In some implementations, the warp and blend unit 570 may warp a corona around the equator of a respective frame to a rectangle. For example, the warp and blend unit 570 may warp a corona around the equator of a respective frame to a rectangle based on the corresponding low-resolution frame generated by the front image signal processor 510.

The warp and blend unit 570 may apply one or more transformations to the frames. In some implementations, spherical images produced by a multi-face camera device, such as the image capture apparatus 110 shown in FIG. 1 or the image capture apparatus 300 shown in FIG. 3, may be warped and/or blended by the warp and blend unit 570 to correct for distortions at image edges. In some implementations, the warp and blend unit 570 may apply a transformation that is subject to a close to identity constraint, wherein a location of a pixel in an input image to the warp and blend unit 570 may be similar to, such as within a defined distance threshold of, a location of a corresponding pixel in an output image from the warp and blend unit 570. For example, the warp and blend unit 570 may include an internal memory, which may have a size, such as 100 lines, which may be smaller than a size of a frame, and the warp and blend unit 570 may process the input image data in raster-in/raster-out order using a transformation that is subject to a close to identity constraint.

In some implementations, the warp and blend unit 570 may apply a transformation that is independent of close to identity constraints, which may include processing the input image data in raster-in/dynamic-out or dynamic-in/raster-out order. For example, the warp and blend unit 570 may transform two or more non-rectilinear, such as fisheye, images to generate a combined frame, such as an equirectangular frame, by processing the input image data in raster-in/dynamic-out or dynamic-in/raster-out order.

The stitching cost unit 580 may generate a stitching cost map as an output. In some implementations, the cost map may be represented as a rectangle having disparity (x) and longitude (y) based on a warping. Respective values of the cost map may be a cost function of a disparity (x) value for a corresponding longitude. Cost maps may be generated for various scales, longitudes, and disparities.

The scaler 585 may scale images received from the output of the warp and blend unit 570, which may be in patches, or blocks, of pixels, such as 16×16 blocks, 8×8 blocks, or patches or blocks of any other size or combination of sizes.

The image signal processing bus 590 may be a bus or interconnect, such as an on-chip interconnect or embedded microcontroller bus interface, for communication between the front image signal processor 510, the temporal noise reduction unit 542, the local motion compensation unit 522, the raw to raw unit 544, the raw to YUV unit 550, the YUV to YUV unit 560, the combined warp and blend unit 570, the stitching cost unit 580, the scaler 585, the configuration controller 595, or any combination thereof.

The configuration controller 595 may coordinate image processing by the front image signal processor 510, the local motion estimation unit 520, the local motion compensation unit 522, the global motion compensation unit 524, the high dynamic range unit 530, the three-dimensional noise reduction unit 540, the temporal noise reduction unit 542, the raw to raw unit 544, the raw to YUV unit 550, the YUV to YUV unit 560, the warp and blend unit 570, the stitching cost unit 580, the scaler 585, the image signal processing bus 590, or any combination thereof, of the image signal processor 500. For example, the configuration controller 595 may control camera alignment model calibration, auto-exposure, auto-white balance, or any other camera calibration or similar process or combination of processes. In some implementations, the configuration controller 595 may be a microcontroller. The configuration controller 595 is shown in FIG. 5 using broken lines to indicate that the configuration controller 595 may be included in the image signal processor 500 or may be external to, and in communication with, the image signal processor 500. The configuration controller 595 may include a respective clock, power domain, or both.

Figure 6:
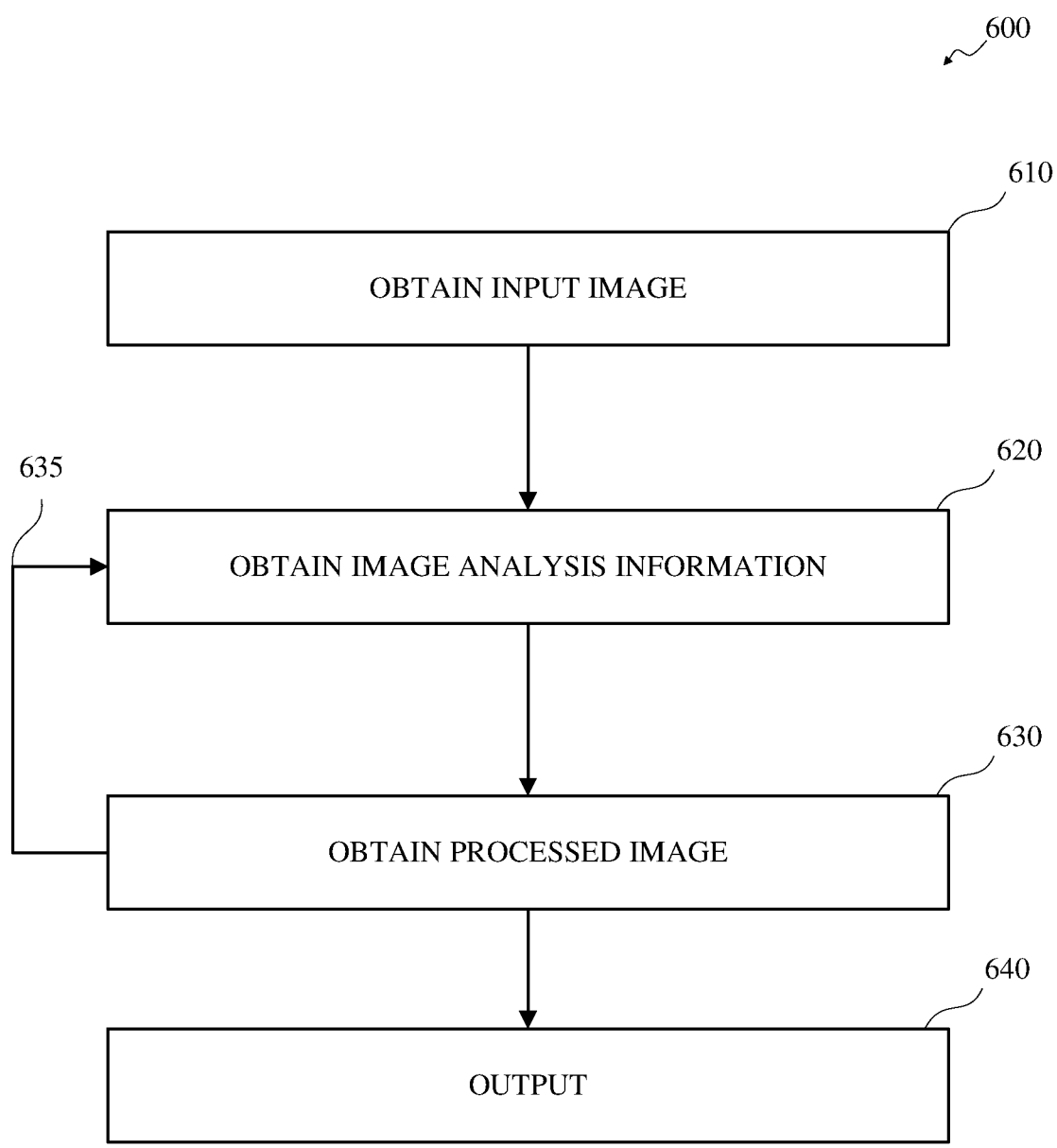
FIG. 6 is a flowchart of an example of image capture and input processing in accordance with implementations of this disclosure.

FIG. 6 is a flowchart of an example of image capture and input processing 600 in accordance with implementations of this disclosure. Image capture and input processing 600 may be implemented in an image capture apparatus, such as the image capture apparatus 110 shown in FIG. 1, or the image capture apparatus 300 shown in FIG. 3.

Image capture and input processing 600 may include obtaining an input image at 610, obtaining image analysis information at 620, obtaining a processed image at 630, outputting the processed image at 640, or a combination thereof.

An input image, or frame, may be obtained at 610. For example, an image analysis unit, which may be included in an image capture apparatus, may receive one or more input image signals, such as the input image signal 430 shown in FIG. 4, from one or more image sensors, such as the image sensor 230 shown in FIG. 2 or the image sensors 340, 342 shown in FIG. 3, and may identify or obtain one or more input images, or frames, from the one or more input image signals, which may include buffering the input images or frames. In some implementations, the input images or frames may be associated with respective temporal information indicating a respective temporal location, such as a time stamp, a date stamp, sequence information, or a combination thereof. For example, the input images or frames may be included in a stream, sequence, or series of input images or frames, such as a video, and respective input images or frames may be associated with respective temporal information.

The input image may be represented or expressed in a defined format, such as the Bayer format or the RGB format, wherein the luminance and color of a pixel, or a set of pixels, from the input image is represented as a value or a combination of values, such as a combination of a red channel, or component, value (R), a green channel, or component, value (G), and a blue channel, or component, value (B). Although described with reference to RGB format for simplicity, the techniques described herein may be implemented in another format, such as the Bayer format.

The red component value (R), the green component value (G), and the blue component value (B) may be expressed, respectively, as a magnitude or value, such as an integer value, in a defined range, such as from a defined minimum value (MinSat) to a defined maximum value (MaxSat). For example, a color component value may be expressed as an integer value in the range from zero (MinSat=0) to 100 (MaxSat-100), for simplicity. Other ranges of values or image formats may be used, such as (0-255) or (0-4095). The boundaries of the respective color component value ranges, MinSat and MaxSat, may represent a desaturation value, or point, and saturation value, or point, respectively. The color, including luminance and chrominance, of a pixel may correspond to the respective magnitude of the respective color component values and the ratio between the values of the color components.

The color accuracy of an image, or a portion thereof, as representing the captured content may be limited. The term color accuracy, as used herein, refers to one or more objective metrics representing the degree to which an image presented based on captured image data appears consistent with the scene or content captured by the image as observed by the human visual system.

For example, the color accuracy of an input image may be limited by the available range of color component values. Content having color intensity or brightness for a color component that exceeds the corresponding available range of color component values may be clipped, limited, or omitted, from the captured image based on the defined limit on the range of values for the respective color component, which may be referred herein as saturation clipping.

In an example, a first portion of a bright blue object may be captured by a first pixel in an input image and may have a blue component value of 100. A second portion of the bright blue object may be captured by a second pixel in the input image and may have a blue component value of 100, which may be the saturation value for the respective color component. The second portion may be brighter than the first portion and the difference in color between the first portion and the second portion may be clipped, limited, or omitted, from the captured image based on the defined limit on the range of values for the respective color component.

Image capture and input processing 600 may include processing, correcting, or adjusting image data, such as color component values, of an input image to improve color accuracy and limit or remove artifacts. For example, image capture and input processing 600 may include automatic exposure (AE) image correction, automatic white balance (AWB) image correction, color lens shading (CLS) image correction, or any other image correction or combination thereof.

Image analysis information may be obtained at 620. For example, the image analysis unit may preform image analysis, which may include analyzing the input image, or a portion thereof, to obtain or generate the image analysis information.

Image analysis may include obtaining image processing information, such as image processing information associated with a previously processed image as indicated at 635, such as the image or frame sequentially preceding the current input image. For example, the image analysis unit may obtain the image processing information from an image signal processor, such as the image signal processor 410 shown in FIG. 4 or the image signal processor 500 shown in FIG. 5. For example, the image processing information may include color component ratio information for the previously processed image, such as green channel to red channel ratio information (G/R), green channel to blue channel ratio information (G/B), or both.

Image analysis, which may be referred to as camera control, may include obtaining or generating image analysis information including one or more image analysis parameters, such as automatic exposure image analysis parameters, automatic white balance image analysis parameters, color lens shading image analysis parameters, or any other image analysis parameters or combination thereof.

Image analysis may include automatic exposure analysis, which may include obtaining or generating automatic exposure information, which may include automatic exposure image analysis parameters. For example, the automatic exposure information may include automatic exposure level, or brightness level, information, which may include an automatic exposure level value, an automatic exposure level category identifier, or both.

Figure 7:
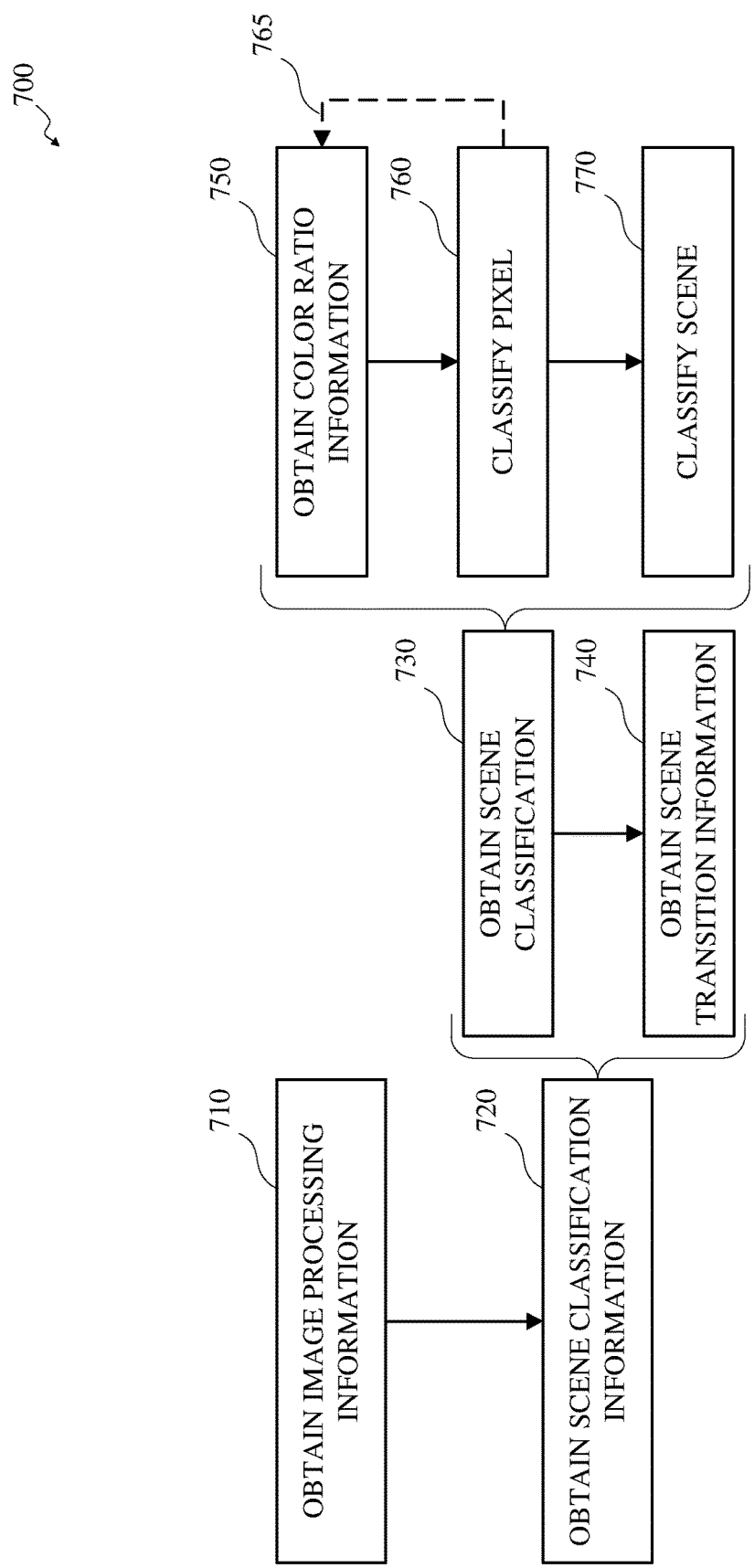
FIG. 7 is a flowchart of an example of scene classification in accordance with implementations of this disclosure.
Figure 8:
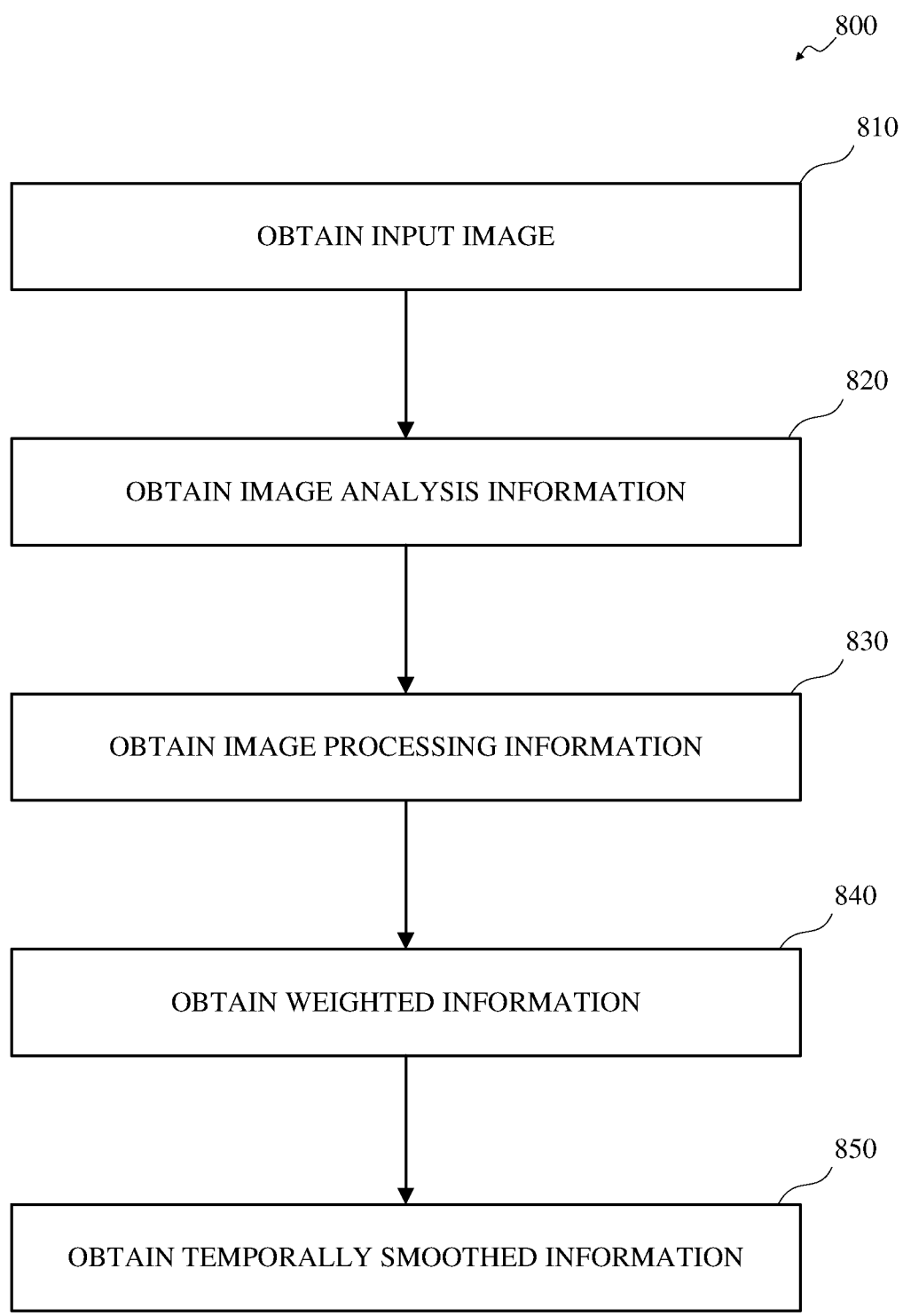
FIG. 8 is a flowchart of an example of obtaining automatic white balance correction information 800 in accordance with implementations of this disclosure.

Image analysis may include automatic white balance analysis, which may include obtaining or generating automatic white balance information, such as automatic white balance image analysis parameters, which may include color temperature information, scene classification information, automatic white balance correction information, such as gains, scales, or correction coefficients, or any other automatic white balance information or combination thereof. An example of obtaining scene classification information is shown in FIG. 7. An example of obtaining automatic white balance correction information is shown in FIG. 8.

Image analysis may include color lens shading analysis, which may include obtaining or generating color lens shading information, such as color lens shading image analysis parameters, which may include color lens shading map information, color lens shading scales, gains, or correction coefficients, or any other color lens shading information or combination thereof.

Figure 11:
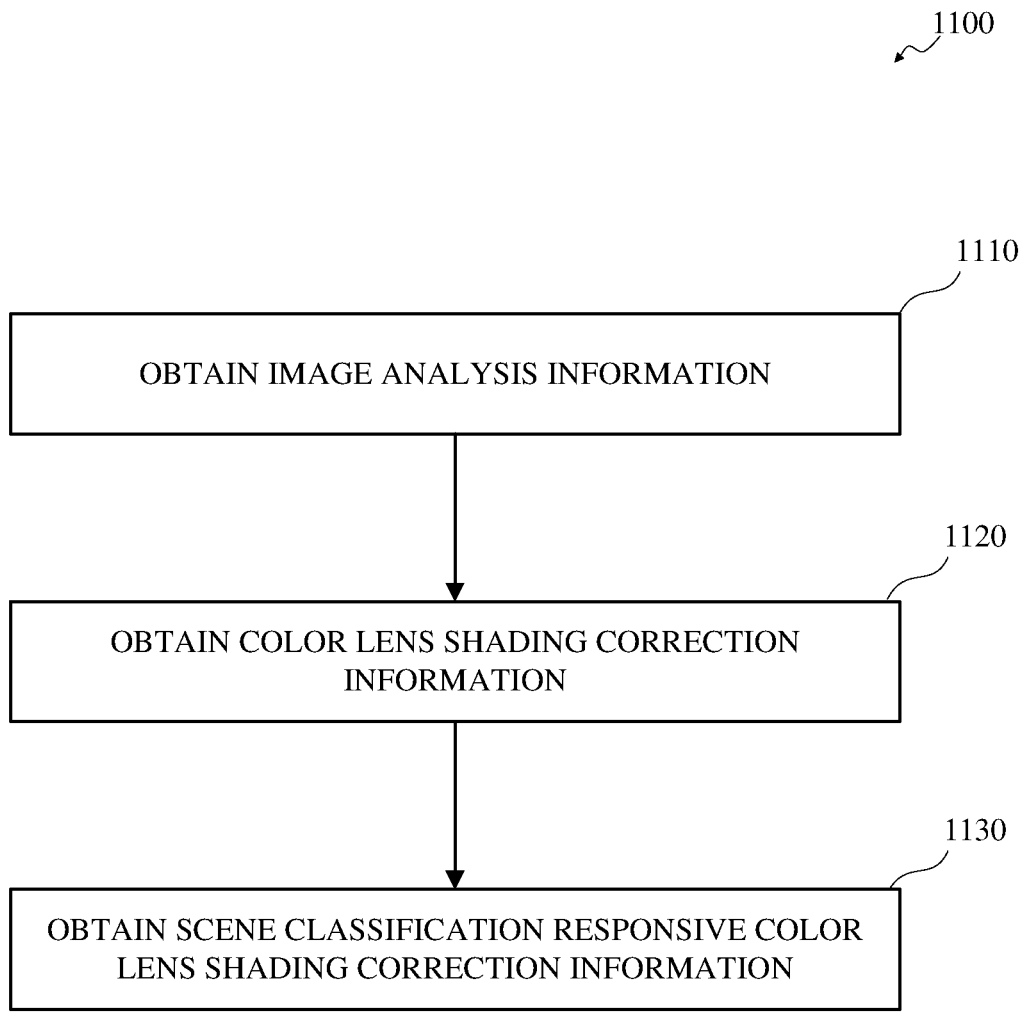
FIG. 11 is a flowchart of an example of scene classification responsive color lens shading correction analysis 1100 in accordance with implementations of this disclosure.

The color lens shading information may include a field-variable gain, which may indicate a gain, scale, or coefficient value as a function of pixel position in the image. For example, color lens shading map information may include a table, or other data storage unit or structure, including coefficients that indicate correction gains corresponding to respective pixel position for color correction of a current image. The color lens shading information may include respective color lens shading information for respective color components, such as color lens shading information for the red component and color lens shading information for the blue component. In some implementations, color lens shading analysis may be performed subsequent to automatic white balance analysis. An example of obtaining or generating color lens shading information is shown in FIG. 11.

A processed image may be obtained or generated at 630. For example, an image signal processor, such as the image signal processor 410 shown in FIG. 4 or the image signal processor 500 shown in FIG. 5, which may be included in the image capture apparatus, may obtain or receive the input image identified at 610, the image analysis information generated at 620, the image processing information associated with the previously processed image as indicated at 635, or a combination thereof. Image signal processing may include generating a processed image corresponding to the input image obtained at 610, which may include color lens shading correction, automatic white balance correction, or any other image processing or combination thereof.

Obtaining the processed image at 630 may include obtaining a color lens shading corrected image. The image capture apparatus may include a color lens shading correction unit implementing color lens shading correction. For example, a raw to raw unit, such as the raw to raw unit 544 shown in FIG. 5, of the ISP may implement color lens shading correction.

Obtaining a color lens shading corrected image may include color lens shading correcting the input image obtained at 610 based on the image analysis information obtained at 620, such as the color lens shading correction information.

Obtaining the processed image at 630 may include obtaining an automatic white balance corrected image. The image capture apparatus may include an automatic white balance correction unit implementing automatic white balance correction. For example, a raw to raw unit, such as the raw to raw unit 544 shown in FIG. 5, of the ISP may implement automatic white balance correction. In some implementations, automatic white balance correction may be performed subsequent to color lens shading correction. For example, automatic white balance correction may be performed using the color lens shading corrected image.

Obtaining the automatic white balance corrected image may include automatic white balance correcting the input image obtained at 610, or the color lens shading corrected image, based on the image analysis information obtained at 620, such as the automatic white balance correction information.

In some implementations, image analysis at 620 and image processing at 630 may be performed sequentially (as shown), or substantially sequentially. Substantially sequentially may indicate that portions or aspects of image analysis at 620 may precede portions or aspects of image processing at 630, and portions or aspects of image analysis at 620 may be performed in parallel or concurrently with portions or aspects of image processing at 630, such that the amount of image analysis that precedes portions or aspects of image processing exceeds the amount of image analysis performed concurrently with portions or aspects of image processing. For example, the amount of image analysis or image processing may be based on a cardinality of operations, clock cycles, or temporal duration.

In some implementations, image analysis at 620 and image processing at 630 may be performed concurrently or in parallel (not expressly shown), or substantially concurrently. Substantially concurrently may indicate that portions or aspects of image analysis at 620 may precede portions or aspects of image processing at 630, and portions or aspects of image analysis at 620 may be performed in parallel or concurrently with portions or aspects of image processing at 630, such that the amount of image analysis that precedes portions or aspects of image processing is less than the amount of image analysis performed concurrently with portions or aspects of image processing. For example, the amount of image analysis or image processing may be based on a cardinality of operations, clock cycles, or temporal duration.

In an example, concurrent image analysis and image processing may include image processing at 630 of a current frame (N) using image analysis information obtained based on image analysis of a first preceding frame (N−1) and image processing information obtained based on image processing of a second preceding frame (N−2), preceding the first preceding frame.

In another example, concurrent image analysis and image processing may include image analysis at 620 of the current frame (N) based on image processing information obtained based on image processing of a preceding frame (N−1) and may include obtaining image analysis information for image processing of a subsequent frame (N+1).

In another example, concurrent image analysis and image processing may include image processing at 630 of the current frame (N) to obtain image processing information for image analysis of a first subsequent frame (N+1) to obtain image analysis information for image processing of a second subsequent frame (N+2), subsequent to the first subsequent frame.

Obtaining a processed image at 630 may include obtaining image processing information, such as color component ratio information for the processed image, such as green channel to red channel ratio information, green channel to blue channel ratio information, or both, and outputting the processed image information as indicated at 635 for image analysis of a subsequent image.

The processed image may be output at 640. For example, the image signal processor may output, send, transmit, or write the processed image, which may include storing the processed image, such as in a memory of the image capture apparatus, such as the electronic storage unit 224 shown in FIG. 2, or otherwise outputting the processed image data such that the processed image data is accessible by another unit of the image signal processor, or another unit of the image capture apparatus, such as an encoder, such as the encoder 420 shown in FIG. 4, for generating an encoded output bitstream, or to an external device.

FIG. 7 is a flowchart of an example of scene classification 700 in accordance with implementations of this disclosure. Scene classification 700 may be implemented in an image capture apparatus, such as the image capture apparatus 110 shown in FIG. 1, or the image capture apparatus 300 shown in FIG. 3.

Scene classification 700 may include obtaining image processing information at 710, obtaining scene classification information at 720, or a combination thereof.

Image processing information may be obtained at 710. Obtaining image processing information at 710 may be similar to obtaining image processing information as shown at 635 in FIG. 6. For example, the image processing information may include automatic white balance processing information obtained from, or based on, processing a previous or preceding image or frame. The image processing information may include color component ratio information for the previously processed image, such as green component (G) to red component (R) ratio information (G/R), green component to blue component (B) ratio information (G/B), or both. A color component ratio value may correspond to a respective pixel from the previously processed image. For example, the image processing information may include respective color component ratio information for each pixel from the previously processed frame, or a portion thereof. The image processing information may include scene classification information used for processing the previously processed image, such as scene classification information generated for an image prior to the preceding image. In some implementations, color component ratios may be obtained based on analysis of the current input image.

Scene classification information may be obtained at 720. Obtaining scene classification information may include obtaining a scene classification at 730, obtaining scene transition information at 740, or both.

Obtaining a scene classification at 730 may include evaluating or analyzing the image processing information to identify a cardinality, number, or count, of values corresponding to a defined scene classification. A scene classification may indicate an image capture context for an image, or a sequence of images, such as underwater, daylight, indoor, overcast, or any other scene classification.

Obtaining a scene classification at 730 may include obtaining color component ratio information corresponding to a pixel from the previously processed image at 750, classifying the respective pixel at 760, classifying the scene at 770, or a combination thereof.

For example, the image processing information may include color component ratio information for the previously processed image corresponding to a respective pixel from the previously processed image, and the color component ratio information corresponding to the pixel from the previously processed image may be obtained from the image processing information at 750.

The respective pixel may be classified at 760. A scene classification may be obtained for the current pixel at 760 based on the color component ratio information corresponding to the current pixel obtained at 750.

Color component ratio information corresponding to the current pixel may include a color component ratio value, such as a green to red color component ratio value, that exceeds, such as is greater than, a defined threshold, such as a defined green component to red component color ratio threshold, such as three (3), which may be expressed as (G/R>3), and the current pixel may be classified as corresponding to an underwater scene.

In another example, the color component ratio information corresponding to the current pixel may include a color component ratio value, such as a green to red color component ratio value, that is within, such as is equal to or less than, the corresponding defined threshold, which may be expressed as (G/R<=3), and the current pixel may be classified as corresponding to a scene other than an underwater scene.

In some implementations, the color component ratio information corresponding to the current pixel may include multiple color component ratio values, such as a green to red color component ratio value and a green to blue color component ratio value, and a location of the color component ratio values in a corresponding color component ratio space may be obtained. For example, color component ratio space may represented as a matrix or Cartesian plane and the location of the color component ratio values in the corresponding color component ratio space may correspond with an intersection of a first color component ratio value, such as the red color component ratio value, along a first axis of the color component ratio space and a second color component ratio value, such as the blue color component ratio value, along a second axis of the color component ratio space. Locations corresponding to a defined portion or area in the color component ratio space may be identified as corresponding to an underwater scene and locations corresponding to other portions of the color component ratio space may be identified as corresponding to scenes other than underwater scenes. The defined portion of the color component ratio space may be identified based on defined color ratio thresholds.

Respective scene classification information may be obtained for pixels from the frame as indicated by the broken line at 765, such as for each pixel from the previously processed image, or for a portion of the pixels from the previously processed image.

The scene, corresponding to the previously processed image, may be classified at 770. For example, the scene may be classified based on the pixel classifications obtained at 760. For example, a cardinality or count of pixels corresponding to respective scene classifications may be obtained and the scene classification corresponding to the largest cardinality of pixels may be identified as the current scene classification.

In another example, the image processing information obtained at 710 may include a previously identified scene classification and classifying the scene at 770 may include classifying the scene based on the previously identified scene classification, the respective cardinalities of pixel classifications identified at 760, and defined scene classification thresholds. For example, the cardinality of pixels classified as corresponding to a respective scene classification may be within a corresponding defined scene classification threshold, and the previously identified scene classification may be identified as the current scene classification. In another example, the cardinality of pixels classified as corresponding to the respective scene classification may be at lease, such as equal to or greater than, the corresponding defined scene classification threshold, and the respective scene classification may be identified as the current scene classification.

In some implementations, obtaining the scene classification at 770 may include obtaining a scene classification confidence level, which may indicate a ratio or proportion of a cardinality of pixels classified as corresponding to an underwater scene to a cardinality of pixels classified as corresponding to a scene other than an underwater scene, as identified at 760. For example, a scene classification confidence level based on image processing information for a preceding image or frame may exceed a defined underwater scene classification confidence threshold, such as 50%, and the scene classification may be identified as underwater.

Scene transition information may be obtained at 740. The scene classification obtained at 730 may differ from the previously identified scene classification, which may correspond to a frame sequentially preceding the previously processed frame, and scene classification transition information indicating a scene transition may be identified.

For example, scene classification information obtained for a current frame (N) may be obtained based on image processing information obtained for a first preceding frame (N−1) and a previously obtained scene classification obtained based on a second preceding frame (N−2), preceding the first preceding frame. In an example, the previously obtained scene classification obtained based on a second preceding frame (N−2) may indicate an underwater scene classification, the scene classification information based on image processing information obtained for the first preceding frame (N−1) may indicate a scene classification other than an underwater scene classification, and an exit-underwater scene transition may be identified. In another example, the previously obtained scene classification obtained based on a second preceding frame (N−2) may indicate a scene classification other than an underwater scene classification, the scene classification information based on image processing information obtained for the first preceding frame (N−1) may indicate an underwater scene classification, and an enter-underwater scene transition may be identified.

Although scene classification is described as preceding automatic white balance analysis, other methods of scene classification, such as computer vision based scene classification performed subsequent to automatic white balance analysis, may be used.

FIG. 8 is a flowchart of an example of obtaining automatic white balance correction information 800 in accordance with implementations of this disclosure. Obtaining automatic white balance correction information 800 may be implemented in an image capture apparatus, such as the image capture apparatus 110 shown in FIG. 1, or the image capture apparatus 300 shown in FIG. 3.

Obtaining automatic white balance correction information 800 may include obtaining an input image at 810, obtaining image analysis information at 820, obtaining image processing information at 830, obtaining weighted automatic white balance correction information at 840, obtaining temporally smoothed automatic white balance correction coefficients at 850, or a combination thereof.

An input image may be obtained at 810. For example, obtaining the input image at 810 may be similar to obtaining an input image as shown at 610 in FIG. 6.

Image analysis information may be obtained at 820. For example, obtaining image analysis information at 820 may include obtaining automatic exposure information for the input image, obtaining color temperature information for the input image, obtaining scene classification information, which may be similar to obtaining scene classification information as shown in FIG. 7, or a combination thereof.

Obtaining color temperature information may include identifying a color temperature of an illuminant of the scene, such as using a grey world technique, a white point technique, a color by correlation technique, or any other color temperature determination technique.

Image processing information based on a previously processed image may be obtained at 830. For example, obtaining the image processing information may be similar to obtaining image processing information as shown at 710 in FIG. 7.

Weighted automatic white balance correction information may be obtained at 840. An example of obtaining weighted automatic white balance correction information is shown in FIG. 9.

Figure 10:
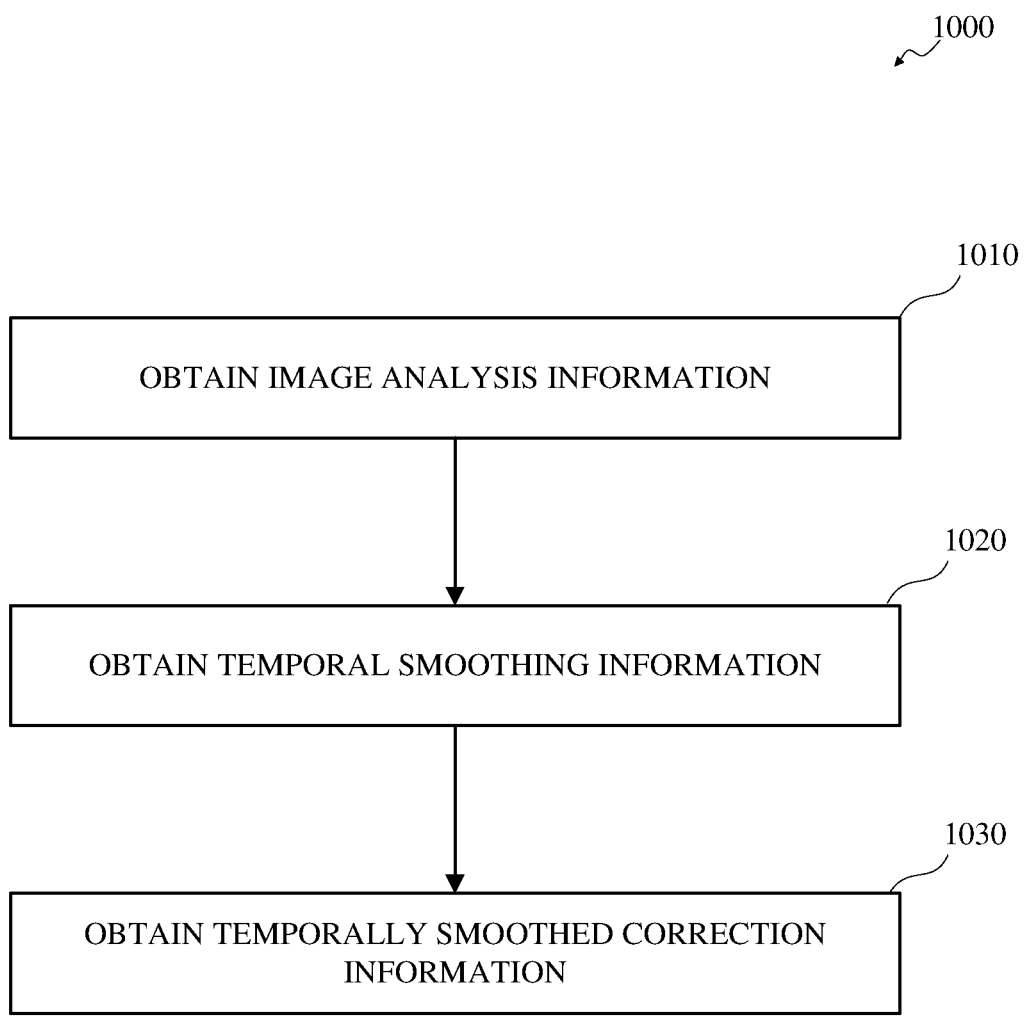
FIG. 10 is a flowchart of an example of automatic white balance correction analysis with temporal smoothing 1000 in accordance with implementations of this disclosure.

Temporally smoothed automatic white balance correction information may be obtained at 850. An example of obtaining temporally smoothed white balance correction information is shown in FIG. 10.

Figure 9:
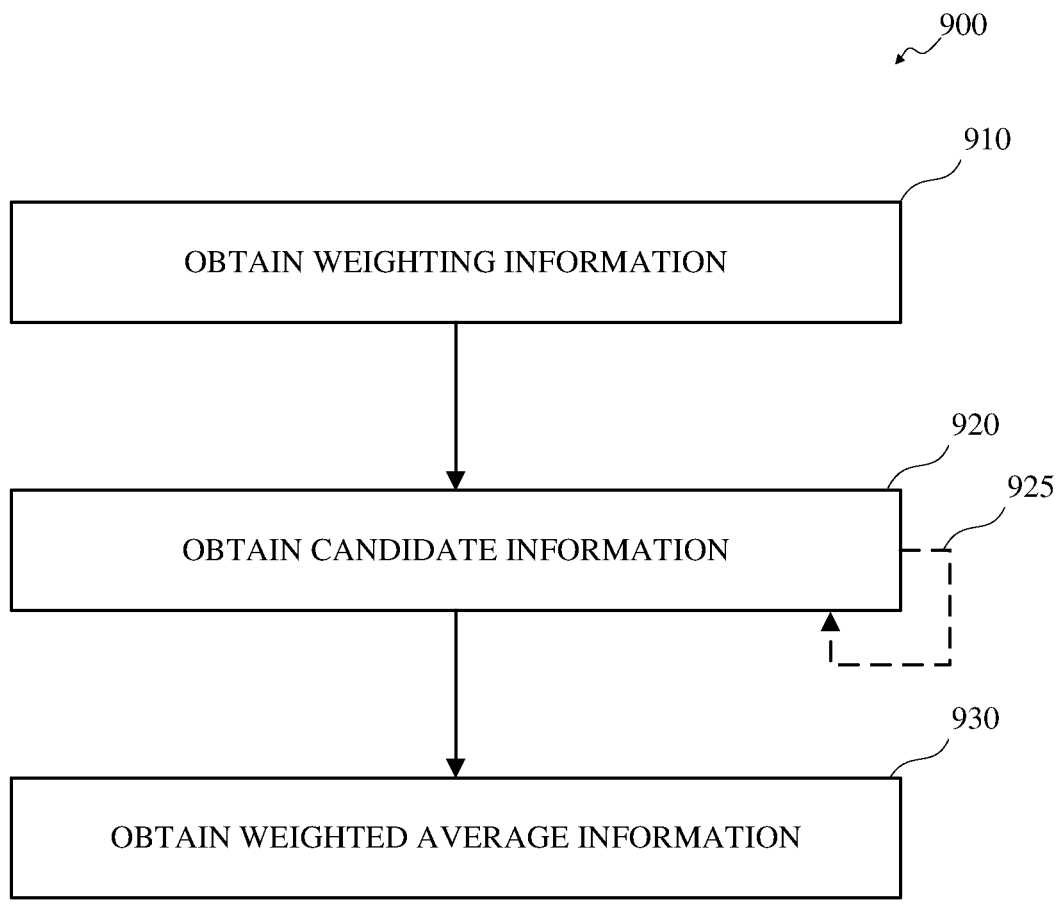
FIG. 9 is a flowchart of an example of obtaining weighted automatic white balance correction information 900 in accordance with implementations of this disclosure.

FIG. 9 is a flowchart of an example of obtaining weighted automatic white balance correction information 900 in accordance with implementations of this disclosure. Obtaining weighted automatic white balance correction information 900 may be implemented in an image capture apparatus, such as the image capture apparatus 110 shown in FIG. 1, or the image capture apparatus 300 shown in FIG. 3.

Obtaining weighted automatic white balance correction information 900 may include obtaining automatic white balance correction weighting information at 910, obtaining candidate automatic white balance correction information at 920, obtaining weighted average automatic white balance correction information at 930, or a combination thereof.

Although not shown separately in FIG. 9, obtaining weighted automatic white balance correction information 900 may include obtaining an input image, which may be similar to obtaining an input image as shown at 810 in FIG. 8, obtaining image analysis information, which may be similar to obtaining image analysis information as shown at 820 in FIG. 8, obtaining image processing information, which may be similar to obtaining image processing information as shown at 830 in FIG. 8, or a combination thereof.

Automatic white balance correction weighting information may be obtained at 910. Obtaining automatic white balance correction weighting information at 910 may include generating the automatic white balance correction weighting information using machine learning, such as supervised machine learning. For example, the automatic white balance correction weighting information may be obtained using linear regression to minimize error based on training data, such as human annotated training images. The automatic white balance correction weighting information may be generated independently of, such as prior to, image capture, analysis, or processing for the current image, stored in a memory of the image capture apparatus, and obtaining the automatic white balance correction weighting information may include reading, or otherwise accessing, the automatic white balance correction weighting information from the memory.

The automatic white balance correction weighting information may include automatic white balance correction weighting information corresponding to a respective available automatic white balance correction analysis model. An automatic white balance correction analysis model may be a model, method, technique, or algorithm for obtaining automatic white balance correction information for automatic white balance correction of an input image. For example, using an automatic white balance correction analysis model may include obtaining automatic white balance correction information for automatic white balance correction of an input image, which may include a red component correction coefficient, scale, or gain, (GR) and a blue component correction coefficient, scale, or gain, (GB).

The automatic white balance correction weighting information corresponding to a respective available automatic white balance correction analysis model may indicate a relative accuracy of the corresponding automatic white balance correction analysis model. For example, a first available automatic white balance correction analysis model may identify a first set of automatic white balance correction information based on a defined input, such as a defined training image or sequence of images, a second available automatic white balance correction analysis model may identify a second set of automatic white balance correction information based on the defined input, the first set of automatic white balance correction information may be relatively accurate, such as relatively similar to human annotated white balancing correction information for the defined input, the second set of automatic white balance correction information may be relatively inaccurate, such as relatively dissimilar from the human annotated white balancing correction information for the defined input, relatively high automatic white balance correction weighting information, such as 0.6, may be associated with the first available automatic white balance correction analysis model, and relatively low automatic white balance correction weighting information, such as 0.01, may be associated with the second available automatic white balance correction analysis model.

Available automatic white balance correction analysis models may include a first automatic white balance correction analysis model, such as a Gray World model, a Perfect Reflector Model, or a Fuzzy Rules Model; a second automatic white balance correction analysis model, such as a fixed D50 illuminant model; and a third automatic white balance correction analysis model. The automatic white balance correction weighting information may include automatic white balance correction weighting information corresponding to the first automatic white balance correction analysis model, automatic white balance correction weighting information corresponding to the second automatic white balance correction analysis model, and automatic white balance correction weighting information corresponding to the third automatic white balance correction analysis model.

In another example, a set of available automatic white balance correction analysis models may have a cardinality of N ($M_1, \ldots, M_N$), and the automatic white balance correction weighting information may include N sets of automatic white balance correction weighting information, each set of automatic white balance correction weighting information corresponding to a respective available automatic white balance correction analysis model.

In some implementations, the automatic white balance correction weighting information may include a set of color component weights, such as a red component weight (WR) and a blue component weight (WB). The automatic white balance correction weighting information corresponding to a respective available automatic white balance correction analysis model ($M_1$) may be expressed as ($WR_1$, $WB_1$).

Candidate automatic white balance correction information may be obtained at 920. Obtaining the candidate automatic white balance correction information may include obtaining candidate automatic white balance correction coefficient sets at 920, which may include obtaining N candidate automatic white balance correction coefficient sets, each candidate automatic white balance correction coefficient set corresponding to a respective available automatic white balance correction analysis model as indicated by the broken line at 925. For example, the automatic white balance correction coefficient set obtained based on a first available automatic white balance correction analysis model ($M_1$) may be expressed as ($GR_1$, $GB_1$) and the automatic white balance correction coefficient set obtained based on a second available automatic white balance correction analysis model ($M_2$) may be expressed as ($GR_2$, $GB_2$).

In some implementations, candidate automatic white balance correction information may be associated with other metrics. For example, obtaining the candidate automatic white balance correction information at 920 may include obtaining a candidate automatic white balance correction coefficient set corresponding to an available automatic white balance correction analysis model ($M_1$) and an automatic exposure level. A different candidate automatic white balance correction coefficient set may be obtained corresponding to the available automatic white balance correction analysis model ($M_1$) and a different automatic exposure level.

In another example, obtaining the candidate automatic white balance correction information at 920 may include obtaining a candidate automatic white balance correction coefficient set corresponding to the available automatic white balance correction analysis model ($M_1$) and a scene classification. A different candidate automatic white balance correction coefficient set may be obtained corresponding to the available automatic white balance correction analysis model ($M_1$) and a different scene classification.

In some implementations, a candidate automatic white balance correction coefficient set may omit candidate automatic white balance correction information corresponding to a color component, such as the green component, or obtaining the candidate automatic white balance correction information at 920 may include obtaining a first candidate automatic white balance correction coefficient set corresponding to a first available automatic white balance correction analysis model ($M_1$) and a first color component, such as the red component, and obtaining a distinct second candidate automatic white balance correction coefficient set corresponding to the first available automatic white balance correction analysis model ($M_1$) and a second color component, such as the blue component.

Weighted average automatic white balance correction information, such as a weighted average coefficient set, may be obtained at 930. Obtaining the weighted average automatic white balance correction information at 930 may include combining the automatic white balance correction weighting information obtained at 910 and the candidate automatic white balance correction information obtained at 920.

Weighted automatic white balance correction information obtained based on a respective model ($M_1$) and the corresponding automatic white balance correction weighting information may be expressed as ($WR_1*GR_1$, $WB_1*GB_1$).

Average automatic white balance correction information obtained based on the available automatic white balance correction analysis models ($M_1, \ldots, M_N$) may be expressed as ($AGR=GR_1+GR_2+ \ldots +GR_N$, $AGB=GB_1+GB_2+ \ldots +GB_N$).

Weighted average automatic white balance correction information obtained based on the available automatic white balance correction analysis models ($M_1, \ldots, M_N$) and the respective corresponding automatic white balance correction weighting information may be expressed as the following:

$$WAGR=WR_1*GR_1+WR_2*GR_2+ \ldots +WR_N*GR_N,$$

$$WAGB=WB_1*GB_1+WB_2*GB_2+ \ldots +WB_N*GB_N).$$

The automatic white balance correction weighting information obtained at 910 may be generated such that the aggregate accuracy of the weighted average automatic white balance correction information exceeds the respective accuracy of each of the candidate automatic white balance correction coefficient sets and the un-weighted average automatic white balance correction information.

FIG. 10 is a flowchart of an example of automatic white balance correction analysis with temporal smoothing 1000 in accordance with implementations of this disclosure. Automatic white balance correction analysis with temporal smoothing 1000 may be implemented in an image capture apparatus, such as the image capture apparatus 110 shown in FIG. 1, or the image capture apparatus 300 shown in FIG. 3.

Automatic white balance correction analysis with temporal smoothing 1000 may include obtaining image analysis information at 1010, obtaining automatic white balance correction temporal smoothing information at 1020, obtaining temporally smoothed automatic white balance correction information at 1030, or a combination thereof. Although not shown separately in FIG. 10, automatic white balance correction analysis with temporal smoothing 1000 may include obtaining an input image, which may be similar to obtaining an input image as shown at 810 in FIG. 8, obtaining image processing information, which may be similar to obtaining image processing information as shown at 830 in FIG. 8, or a combination thereof.

Image analysis information may be obtained at 1010. Obtaining image analysis information may be similar to obtaining image analysis information as shown at 820 in FIG. 8, except as described herein or otherwise apparent from context.

Obtaining image analysis information at 1010 may include obtaining scene classification information, which may be similar to obtaining scene classification information as shown in FIG. 7 or the scene classification information may be obtained based on a different scene classification model or technique, or a combination of scene classification models or techniques. The scene classification information may indicate a current scene classification for analysis and processing of the input image, scene transition information, or both.

Obtaining image analysis information at 1010 may include obtaining reference automatic white balance correction information corresponding to automatic white balance correction analysis of a previously processed image, such as a sequentially preceding image.

Obtaining image analysis information at 1010 may include obtaining current automatic white balance correction information, which may include weighted automatic white balance correction information obtained for the current input image as shown in FIG. 9.

Automatic white balance correction temporal smoothing information may be obtained at 1020. The automatic white balance correction temporal smoothing information may indicate a limitation of a rate of change of automatic white balance correction information.

Visual characteristics, such as brightness and color temperature, of an automatic white balance corrected frame obtained by automatic white balance correction of an input frame, such as a first frame of a video sequence, using automatic white balance correction information obtained for the first input frame may differ from corresponding visual characteristics of a subsequent automatic white balance corrected frame obtained by automatic white balance correction a subsequent input frame using automatic white balance correction information obtained for the subsequent frame by an amount that is perceivable by the human visual system as an artifact. Automatic white balance correction temporal smoothing may reduce temporal artifacts associated with variations in automatic white balance correction by smoothing automatic white balance correction temporally, such as over a defined number or cardinality of frames, such as five frames or fifty frames, or a defined temporal period, such as a tenth of a second or three seconds.

The automatic white balance correction temporal smoothing information may include an automatic white balance correction temporal smoothing, or damping, coefficient or a set of automatic white balance correction temporal smoothing, or damping, coefficients.

The automatic white balance correction temporal smoothing information may be read, or otherwise accessed, from a memory, such as in a memory of the image capture apparatus, such as the electronic storage unit 224 shown in FIG. 2. The automatic white balance correction temporal smoothing information may be obtained or identified based on a current scene classification. For example, automatic white balance correction temporal smoothing information may be obtained based on a scene classification that indicates an underwater scene and different automatic white balance correction temporal smoothing information may be obtained based on a scene classification that indicates a scene other than an underwater scene.

For example, the current scene classification obtained at 1010 may indicate an underwater scene and the automatic white balance correction temporal smoothing information obtained at 1020 may indicate a temporal smoothing period or duration of fifty frames. In another example, the scene classification information obtained at 1010 may indicate a scene transition from an underwater scene to a scene other than an underwater scene and the automatic white balance correction temporal smoothing information obtained at 1020 may indicate a temporal smoothing period or duration of five frames. The automatic white balance correction temporal smoothing information for a scene transition from an underwater scene classification to a scene classification other than underwater may differ from automatic white balance correction temporal smoothing information for a scene transition from a scene classification other than underwater to an underwater scene classification.

Temporally smoothed automatic white balance correction information may be obtained at 1030. The temporally smoothed automatic white balance correction information may be obtained as a weighted sum of the reference automatic white balance correction information obtained at 1010 and the current automatic white balance correction information obtained at 1010. The a reference automatic white balance correction information obtained at 1010 and the current automatic white balance correction information obtained at 1010 may be weighted based on the automatic white balance correction temporal smoothing information obtained at 1020, such that the relative weight of the current automatic white balance correction information is inversely proportional to the temporal smoothing period indicated by the automatic white balance correction temporal smoothing information.

For example, x may be an automatic white balance correction coefficient, w(t) may be an automatic white balance correction temporal smoothing coefficient, which may be based on a call rate, such as 5 per second or 10 per second, scene classification or transition, magnitude of change (transition adaptation, speed of convergence correspond to variation to minimize oscillation and time delay for a correct correction, and temporal smoothing may be expressed as $x(t)=x(t)+w(t)\cdot(x(t-1)-x(t))$.

FIG. 11 is a flowchart of an example of scene classification responsive color lens shading correction analysis 1100 in accordance with implementations of this disclosure. Scene classification responsive color lens shading correction analysis 1100 may be implemented in an image capture apparatus, such as the image capture apparatus 110 shown in FIG. 1, or the image capture apparatus 300 shown in FIG. 3.

Scene classification responsive color lens shading correction analysis 1100 may include obtaining image analysis information at 1110, obtaining color lens shading correction information at 1120, obtaining scene classification responsive color lens shading correction information at 1130, or a combination thereof. Although not shown separately in FIG. 11, scene classification responsive color lens shading correction analysis 1100 may include obtaining an input image, which may be similar to obtaining an input image as shown at 810 in FIG. 8, obtaining image processing information, which may be similar to obtaining image processing information as shown at 830 in FIG. 8, or a combination thereof.

Image analysis information may be obtained at 1110. Obtaining image analysis information may be similar to obtaining image analysis information as shown at 820 in FIG. 8, except as described herein or otherwise apparent from context. Obtaining image analysis information at 1110 may include obtaining color temperature information for analysis and processing of the input image. Obtaining image analysis information at 1110 may include obtaining scene classification information, which may be similar to obtaining scene classification information as shown in FIG. 7 or the scene classification information may be obtained based on a different scene classification model or technique, or a combination of scene classification models or techniques. The scene classification information may indicate a current scene classification for the input image, scene transition information, or both.

Color lens shading correction information may be obtained at 1120. For example, the color lens shading correction information may be obtained based on the color temperature information obtained at 1110.

Scene classification responsive color lens shading correction information may be obtained at 1130. Obtaining the scene classification responsive color lens shading correction information may include transforming the color lens shading correction information obtained at 1120 based on the scene classification obtained at 1110.

In some implementations, obtaining the color lens shading correction information at 1120 and obtaining the scene classification responsive color lens shading correction information at 1130 may be combined. For example, the color temperature information identified at 1110 may be transformed based on the scene classification information obtained at 1110, and scene classification responsive color lens shading correction information may be obtained based on the transformed color temperature information.

In an example, the scene classification information obtained at 1110 may indicate an underwater scene classification, the color temperature information obtained at 1110 may indicate a color temperature within, such as less than, a lower bound, or minimum, underwater color temperature and transforming the color temperature information identified at 1110 based on the scene classification information obtained at 1110 may include using a lower bound, or minimum, underwater color temperature as the color temperature for obtaining scene classification responsive color lens shading correction information.

Where certain elements of these implementations may be partially or fully implemented using known components, those portions of such known components that are necessary for an understanding of the present disclosure have been described, and detailed descriptions of other portions of such known components have been omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote any type of interconnection or communication architecture that may be used to communicate data between two or more entities. The "bus" could be optical, wireless, infrared or another type of communication medium. The exact topology of the bus could be, for example, standard "bus," hierarchical bus, network-on-chip, address-event-representation (AER) connection, or other type of communication topology used for accessing, for example, different memories in a system.

As used herein, the terms "computer," "computing device," and "computerized device" include, but are not limited to, personal computers (PCs) and minicomputers (whether desktop, laptop, or otherwise), mainframe computers, workstations, servers, personal digital assistants (PDAs), handheld computers, embedded computers, programmable logic devices, personal communicators, tablet computers, portable navigation aids, Java 2 Platform, Micro Edition (J2ME) equipped devices, cellular telephones, smart phones, personal integrated communication or entertainment devices, or literally any other device capable of executing a set of instructions.

As used herein, the term "computer program" or "software" is meant to include any sequence of machine cognizable steps which perform a function. Such program may be rendered in virtually any programming language or environment including, for example, C/C++, C #, Fortran, COBOL, MATLAB™, PASCAL, Python, assembly language, markup languages, such as HTML, Standard Generalized Markup Language (SGML), XML, Voice Markup Language (VoxML), as well as object-oriented environments such as the Common Object Request Broker Architecture (CORBA), Java™ (including J2ME, Java Beans), and/or Binary Runtime Environment, such as Binary Runtime Environment for Wireless (BREW).

As used herein, the terms "connection," "link," "transmission channel," "delay line," and "wireless" mean a causal link between any two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include field programmable gate arrays (FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data, including, without limitation, read-only memory (ROM), programmable ROM (PROM), electrically erasable PROM (EEPROM), dynamic random access memory (DRAM), Mobile DRAM, synchronous DRAM (SDRAM), Double Data Rate 2 (DDR/2) SDRAM, extended data out (EDO)/fast page mode (FPM), reduced latency DRAM (RLDRAM), static RAM (SRAM), "flash" memory, such as NAND/NOR, memristor memory, and pseudo SRAM (PSRAM).

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose complex instruction set computing (CISC) processors, microprocessors, gate arrays, such as field programmable gate arrays, PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire, such as FW400, FW110, and/or other variations, USB, such as USB2, Ethernet, such as 10/100, 10/100/1000 (Gigabit Ethernet, 10-Gig-E, and/or other Ethernet implementations), MoCA, Coaxsys, such as TVnet™, radio frequency tuner, such as in-band or out-of-band, cable modem, and/or other radio frequency tuner protocol interfaces, Wi-Fi (802.11), WiMAX (802.16), personal area network (PAN), such as 802.15, cellular, such as 3G, LTE/LTE-A/TD-LTE, GSM, and/or other cellular technology, IrDA families, and/or other network interfaces.

As used herein, the term "Wi-Fi" includes one or more of IEEE-Std. 802.11, variants of IEEE-Std. 802.11, standards related to IEEE-Std. 802.11, such as 802.11 a/b/g/n/s/v, and/or other wireless standards.

As used herein, the term "wireless" means any wireless signal, data, communication, and/or other wireless interface.

By way of non-limiting example, a wireless interface may include one or more of Wi-Fi, Bluetooth, 3G (3GPP/3GPP2), High Speed Downlink Packet Access/High Speed Uplink Packet Access (HSDPA/HSUPA), Time Division Multiple Access (TDMA), Code Division Multiple Access (CDMA)(such as, IS-95A, Wideband CDMA (WCDMA), and/or other wireless technology), Frequency Hopping Spread Spectrum (FHSS), Direct Sequence Spread Spectrum (DSSS), Global System for Mobile communications (GSM), PAN/802.15, WiMAX (802.16), 802.20, narrowband/Frequency Division Multiple Access (FDMA), Orthogonal Frequency Division Multiplex (OFDM), Personal Communication Service (PCS)/Digital Cellular System (DCS), LTE/LTE-Advanced (LTE-A)/Time Division LTE (TD-LTE), analog cellular, cellular Digital Packet Data (CDPD), satellite systems, millimeter wave or microwave systems, acoustic, infrared (i.e., IrDA), and/or other wireless interfaces.

As used herein, the term "robot" may be used to describe an autonomous device, autonomous vehicle, computer, artificial intelligence (AI) agent, surveillance system or device, control system or device, and/or other computerized device capable of autonomous operation.

As used herein, the terms "camera," or variations thereof, and "image capture device," or variations thereof, may be used to refer to any imaging device or sensor configured to capture, record, and/or convey still and/or video imagery which may be sensitive to visible parts of the electromagnetic spectrum, invisible parts of the electromagnetic spectrum, such as infrared, ultraviolet, and/or other energy, such as pressure waves.

While certain aspects of the technology are described in terms of a specific sequence of steps of a method, these descriptions are illustrative of the broader methods of the disclosure and may be modified by the particular application. Certain steps may be rendered unnecessary or optional under certain circumstances. Additionally, certain steps or functionality may be added to the disclosed implementations, or the order of performance of two or more steps may be permuted. All such variations are considered to be encompassed within the disclosure.

What is claimed is:

1. A non-transitory computer-readable storage medium, comprising executable instructions that, when executed by a processor, facilitate performance of operations, the operations including operations to:
   generate, by an image signal processor, a previously processed image, wherein generating the previously processed image includes generating corresponding image processing information;
   obtain, from the image signal processor, the image processing information corresponding to the previously processed image;
   obtain scene classification information for an input image based on the image processing information, wherein to obtain the scene classification information includes to:
      obtain color component ratio information corresponding to a pixel from the previously processed image;
      obtain a pixel classification for the pixel by classifying the pixel based on the color component ratio information corresponding to the pixel; and
      classify the scene based on the pixel classification;
   generate a processed image by processing the input image based on the scene classification information; and
   output the processed image.

2. The non-transitory computer-readable storage medium of claim 1, wherein the image processing information includes automatic white balance correction information, and wherein to obtain the scene classification information includes to obtain the scene classification information based on the automatic white balance correction information.

3. The non-transitory computer-readable storage medium of claim 1, wherein to obtain the scene classification information includes to obtain scene classification information indicating whether a scene captured by the input image is an underwater scene.

4. The non-transitory computer-readable storage medium of claim 1, wherein to classify the pixel includes to:
in response to a determination that a ratio of a green component of the pixel to a red component of the pixel exceeds a corresponding defined threshold, classify the pixel as corresponding to an underwater scene classification; and
in response to a determination that the ratio of the green component of the pixel to the red component of the pixel is within the corresponding defined threshold, classify the pixel as corresponding to a scene classification other than the underwater scene classification.

5. The non-transitory computer-readable storage medium of claim 1, wherein to obtain the color component ratio information includes to obtain color component ratio values corresponding to the pixel, and to classify the pixel includes to:
obtain a location corresponding to the color component ratio values in a corresponding color component ratio space;
in response to a determination that the location is within a defined portion of the color component ratio space, classify the pixel as corresponding to an underwater scene classification; and
in response to a determination that the location is in a portion of the color component ratio space other than the defined portion, classify the pixel as corresponding to a scene classification other than the underwater scene classification.

6. The non-transitory computer-readable storage medium of claim 1, wherein:
to obtain the pixel classification includes to obtain a respective pixel classification for each pixel from a plurality of pixels from the previously processed image; and
to classify the scene includes to:
obtain a respective cardinality of pixels corresponding to candidate scene classifications based on the pixel classification; and
identify a candidate scene classification having a largest cardinality of pixels from the candidate scene classifications as the scene classification.

7. The non-transitory computer-readable storage medium of claim 6, wherein to classify the scene includes to:
obtain a scene classification confidence level indicating a ratio of the cardinality of pixels corresponding to the candidate scene classification having the largest cardinality of pixels to a cardinality of pixels corresponding to the other candidate scene classifications; and
identify the candidate scene classification having the largest cardinality of as the scene classification in response to a determination that the scene classification confidence level exceeds a scene classification confidence threshold.

8. The non-transitory computer-readable storage medium of claim 1, wherein to obtain the scene classification information includes to:
in response to a determination that the scene classification information indicates a scene classification that differs from a previously identified scene classification corresponding to a frame sequentially preceding the previously processed frame, obtain scene classification transition information indicating a scene transition.

9. A method comprising:
generating, by an image signal processor, a previously processed image, wherein generating the previously processed image includes generating corresponding image processing information;
obtaining, from the image signal processor, the image processing information corresponding to the previously processed image;
obtaining scene classification information for an input image based on the image processing information, wherein obtaining the scene classification information includes in response to a determination that the scene classification information indicates a scene classification that differs from a previously identified scene classification corresponding to a frame sequentially preceding the previously processed frame, obtaining scene classification transition information indicating a scene transition;
generating a processed image by processing the input image based on the scene classification information; and
outputting the processed image.

10. The method of claim 9, wherein the image processing information includes automatic white balance correction information, and wherein obtaining the scene classification information includes obtaining the scene classification information based on the automatic white balance correction information.

11. The method of claim 10, wherein obtaining the scene classification information includes:
obtaining color component ratio information corresponding to a pixel from the previously processed image;
obtaining a pixel classification for the pixel by classifying the pixel based on the color component ratio information corresponding to the pixel; and
classifying the scene based on the pixel classification.

12. The method of claim 11, wherein classifying the pixel includes:
in response to a determination that a ratio of a green component of the pixel to a red component of the pixel exceeds a corresponding defined threshold, classifying the pixel as corresponding to an underwater scene classification; and
in response to a determination that the ratio of the green component of the pixel to the red component of the pixel is within the corresponding defined threshold, classifying the pixel as corresponding to a scene classification other than the underwater scene classification.

13. The method of claim 11, wherein obtaining the color component ratio information includes obtaining color component ratio values corresponding to the pixel, and classifying the pixel includes:
obtaining a location corresponding to the color component ratio values in a corresponding color component ratio space;
in response to a determination that the location is within a defined portion of the color component ratio space, classifying the pixel as corresponding to an underwater scene classification; and in response to a determination that the location is in a portion of the color component ratio space other than the defined portion, classifying the pixel as corresponding to a scene classification other than the underwater scene classification.

14. The method of claim 11, wherein:
obtaining the pixel classification includes obtaining a respective pixel classification for each pixel from a plurality of pixels from the previously processed image; and
classifying the scene includes:
   obtaining a respective cardinality of pixels corresponding to candidate scene classifications based on the pixel classification; and
   identifying a candidate scene classification having a largest cardinality of pixels from the candidate scene classifications as the scene classification.

15. The method of claim 14, wherein classifying the scene includes:
obtaining a scene classification confidence level indicating a ratio of the cardinality of pixels corresponding to the candidate scene classification having the largest cardinality of pixels to a cardinality of pixels corresponding to the other candidate scene classifications; and
identifying the candidate scene classification having the largest cardinality of as the scene classification in response to a determination that the scene classification confidence level exceeds a scene classification confidence threshold.

16. The method of claim 9, wherein obtaining the scene classification information includes obtaining scene classification information indicating whether a scene captured by the input image is an underwater scene.

17. An apparatus comprising:
an image sensor;
a processor configured to:
   generate a previously processed image, wherein generating the previously processed image includes generating corresponding image processing information;
   obtain the image processing information corresponding to the previously processed image;
   obtain scene classification information for an input image based on the image processing information, wherein to obtain the scene classification information includes to:
      obtain color component ratio information corresponding to a pixel from the previously processed image;
      obtain a pixel classification for the pixel by classifying the pixel based on the color component ratio information corresponding to the pixel; and
      classify the scene based on the pixel classification;
   generate a processed image by processing the input image based on the scene classification information; and
   output the processed image.

18. The apparatus of claim 17, wherein the processor is configured to obtain the image processing information such that the image processing information includes automatic white balance correction information, and wherein the processor is configured to obtain the scene classification information based on the automatic white balance correction information.

* * * * *